(12) United States Patent
Taylor

(10) Patent No.: US 12,158,138 B2
(45) Date of Patent: Dec. 3, 2024

(54) RENEWABLE GEOTHERMAL ENERGY HARVESTING SYSTEMS AND METHODS

(71) Applicant: Mark H. Taylor, Gibsland, LA (US)

(72) Inventor: Mark H. Taylor, Gibsland, LA (US)

( * ) Notice: Subject to any disclaimer, the term of this patent is extended or adjusted under 35 U.S.C. 154(b) by 0 days.

(21) Appl. No.: 18/075,120

(22) Filed: Dec. 5, 2022

(65) Prior Publication Data

US 2024/0183342 A1 Jun. 6, 2024

(51) Int. Cl.
  *F03G 4/00* (2006.01)
  *F24T 10/00* (2018.01)
  *F24T 10/17* (2018.01)
  *F24T 10/20* (2018.01)
  *F24T 50/00* (2018.01)

(52) U.S. Cl.
  CPC ............ *F03G 4/035* (2021.08); *F03G 4/001* (2021.08); *F03G 4/023* (2021.08); *F03G 4/063* (2021.08); *F24T 10/17* (2018.05); *F24T 10/20* (2018.05); *F24T 50/00* (2018.05); *F24T 2010/53* (2018.05)

(58) Field of Classification Search
  CPC .......... F03G 4/035; F03G 4/001; F03G 4/023; F03G 4/063; F24T 10/17; F24T 10/20; F24T 50/00; F24T 2010/53
  USPC ............................................ 60/641.2–641.4
  See application file for complete search history.

(56) References Cited

U.S. PATENT DOCUMENTS

| | | | |
|---|---|---|---|
| 4,059,959 A | 11/1977 | Matthews | |
| 5,515,679 A | 5/1996 | Shulman | |
| 5,911,684 A * | 6/1999 | Shnell | F24T 10/20 60/659 |
| 8,169,101 B2 * | 5/2012 | Hinders | F28F 3/046 60/641.2 |
| 8,820,394 B2 | 9/2014 | Azzam | |
| 10,995,972 B2 | 5/2021 | Buscheck | |
| 11,421,516 B2 * | 8/2022 | Bowdon | E21B 43/121 |
| 2007/0251237 A1 * | 11/2007 | Zachar | C25B 1/04 60/641.2 |
| 2009/0126923 A1 * | 5/2009 | Montgomery | F02C 1/05 166/57 |
| 2009/0321040 A1 | 12/2009 | Poitras | |
| 2011/0067399 A1 | 3/2011 | Rogers et al. | |
| 2011/0272166 A1 * | 11/2011 | Hunt | B01D 53/002 166/402 |
| 2012/0001429 A1 | 1/2012 | Saar et al. | |
| 2012/0174581 A1 | 7/2012 | Vaughan et al. | |
| 2013/0333383 A1 | 12/2013 | Schwarck | |
| 2019/0346181 A1 * | 11/2019 | Toews | F24T 10/40 |
| 2021/0062682 A1 * | 3/2021 | Higgins | F03G 4/001 |

* cited by examiner

*Primary Examiner* — Hoang M Nguyen
(74) *Attorney, Agent, or Firm* — R. Keith Harrison

(57) ABSTRACT

Renewable geothermal energy harvesting methods may include distributing the working fluid from a ground surface into thermal contact with at least one subterranean geothermal formation; transferring thermal energy from the subterranean geothermal formation to the working fluid; distributing the working fluid from the subterranean geothermal formation back to the ground surface; and distributing the working fluid directly to at least one thermal application system. The thermal application system may be configured to utilize the thermal energy to perform work. The thermal energy may be utilized at the thermal application system to perform the work. Renewable geothermal energy harvesting systems are also disclosed.

20 Claims, 17 Drawing Sheets

RENEWABLE GEOTHERMAL ENERGY HARVESTING SYSTEMS AND METHODS

FIELD

Illustrative embodiments of the disclosure relate to renewable energy. More particularly, illustrative embodiments of the disclosure relate to renewable geothermal energy harvesting systems and methods for extracting geothermal energy for any of various energy applications.

BACKGROUND

The background description provided herein is solely for the purpose of generally presenting the context of the illustrative embodiments of the disclosure. Aspects of the background description are neither expressly nor impliedly admitted as prior art against the claimed subject matter.

In recent years, measures have been devised and implemented to combat climate change. A major initiative in this effort has been to increase exploitation of "Green Energy" or renewable energy sources. Green energy implements a range of measures to reduce carbon dioxide ($CO_2$) emissions to the atmosphere.

Among the most common types of green energy are the renewable wind power and solar power. These energy sources, however, may be unpredictable and not continually available. Wind and solar energy technologies typically require extensive infrastructure and the associated maintenance and braking power sources. These drawbacks are setbacks in attempts to mitigate climate change.

Still further, there is continuing interest in maximizing the efficiency and utility of geothermal energy systems. In one sense, the Earth itself may be viewed as potentially forming an exceedingly large, ready-made energy recovery/storage device or reservoir.

Accordingly, renewable geothermal energy harvesting systems and methods which utilize existing infrastructure to extract geothermal energy for any of various energy applications may be desirable. The geothermal energy harvesting systems and methods may be used in the construction of new geothermal wells or retrofitted to existing wells in the oil and gas industry. The conversion of existing oil and gas wells to geothermal recovery wells to produce green energy using the systems and methods will extend the useful life of marginal or depleted wells.

SUMMARY

Illustrative embodiments of the disclosure are generally directed to renewable geothermal energy harvesting methods. The methods may include distributing at least one working fluid from a ground surface into thermal contact with at least one subterranean geothermal formation; transferring thermal energy from the subterranean geothermal formation to the working fluid; distributing the working fluid from the subterranean geothermal formation back to the ground surface; and distributing the working fluid directly to at least one thermal application system. The thermal application system may be configured to utilize the thermal energy to perform work. The thermal energy may be utilized at the thermal application system to perform the work. Renewable geothermal energy harvesting systems are also disclosed.

Illustrative embodiments of the disclosure are further generally directed to renewable geothermal energy harvesting systems configured to harvest thermal energy from a subterranean geothermal formation and perform work using the thermal energy. An illustrative embodiment of the renewable geothermal energy harvesting systems may include a wellhead at a ground surface. A well casing may extend from the wellhead at the ground surface into and in thermal contact with the subterranean geothermal formation. A fluid flow conduit may extend into the well casing. The fluid flow conduit may be disposed in fluid communication with the wellhead. A well annulus may be disposed between the fluid flow conduit and the well casing. The well annulus may be disposed in fluid communication with the wellhead. A working fluid supply may be disposed in fluid communication with the wellhead. The working fluid supply may be configured to contain at least one working fluid comprising refrigerant. At least one thermal application system may be disposed in direct fluid communication with the wellhead. The thermal application system may be configured to utilize the thermal energy to perform the work. The wellhead may be configured to distribute the working fluid from the ground surface into thermal contact with the subterranean geothermal formation through a first one of the fluid flow conduit and the well annulus and from the subterranean geothermal formation to the thermal application system through a second one of the fluid flow conduit and the well annulus.

BRIEF DESCRIPTION OF THE DRAWINGS

Illustrative embodiments of the disclosure will now be described, by way of example, with reference to the accompanying drawings, in which.

DETAILED DESCRIPTION

Figure 1:
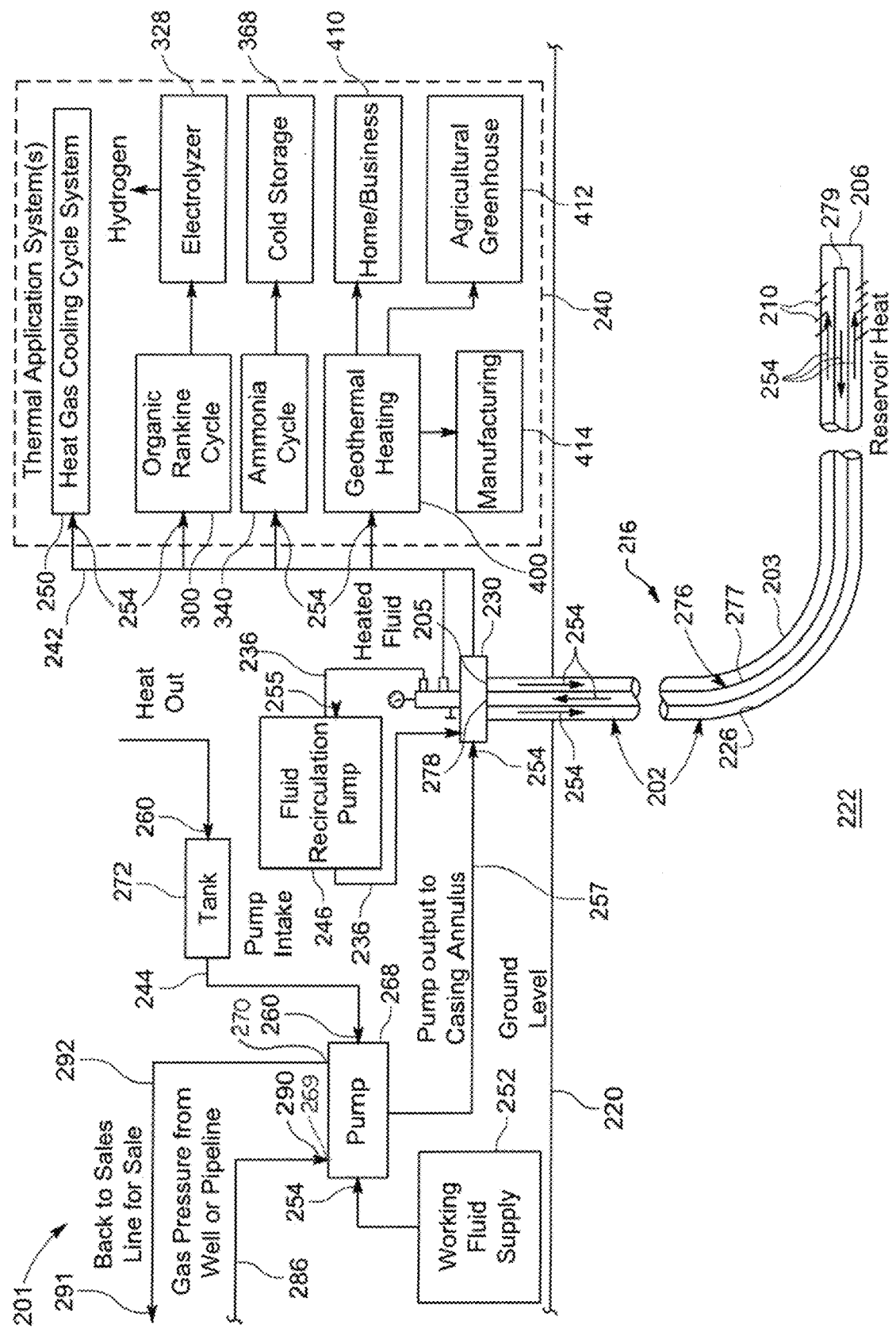
FIG. 1 is a functional block diagram of an illustrative embodiment of the renewable geothermal energy harvesting systems, more particularly illustrating exemplary application of the system in organic rankine cycle, ammonia cycle and various geothermal heating applications.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper". "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-8 of the drawings, an illustrative embodiment of the renewable geothermal energy harvesting systems, hereinafter system, is generally indicated by reference numeral 201. As will be hereinafter described, the system 201 may be suitably configured to harvest native thermal energy from a subterranean geothermal formation 222 to a working fluid 254 and heat the working fluid 254 to a selected target temperature. The harvested thermal energy from the heated working fluid 254 may be utilized or used in at least one thermal application system 240 to drive at least one turbine and/or provide working energy for electrical power generation, heating, cooling, storage, hydrogen production, and/or other purposes. The thermally exhausted working fluid 254 may be returned from the thermal application system 240 to the system 201 for another cycle through the system 201 and the thermal application system 240 in a continuous and repeating loop. Accordingly, in some embodiments, the system 201 and the thermal application system 240 may form separate closed loops which may intersect each other to utilize the thermal energy in the working fluid 254 to perform work, typically as will be hereinafter described.

The temperature of the geothermal formation 222 may depend on various factors such as the location, depth, and geological content and density. A typical temperature range of the geothermal formation 222 at depths of about 760 to 4.880 metres (2.500 to 16,000 feet) may include temperatures between about 65° C. and about 150° C. (150° F. and 300° F.).

The system 201 may include a subterranean well casing 202. The subterranean well casing 202 may be deployed in a drilled wellbore (not numbered) which extends into the subterranean geothermal formation 222.

In some applications, the subterranean well casing 202 may be part of an existing well in the oil and gas industry, or may be a newly installed well which is dedicated to use as the system 201. In the former case, the conversion of existing oil and gas wells to geothermal recovery wells to produce green energy using the systems and methods will extend the useful life of marginal or depleted wells. In the latter case, the wellbore may be drilled and the casing 202 installed as part of a dedicated geothermal well.

The subterranean well casing 202 may have any length necessary to reach the subterranean geothermal formation 222. The wellbore in which the well casing 202 is installed may have any trajectory and may be vertical, horizontal, or any angle between vertical and horizontal at any point or points along its length.

The well casing 202 may have a typically steel well casing wall 203 with a proximal casing end 205 which terminates at or near the ground surface 220 and a fluidly closed or sealed distal casing end 206 which terminates within the geothermal formation 222. In some embodiments, a well casing lining (not illustrated), typically cement or grout, may line the outer surface of the well casing wall 203. In some embodiments, such as in the case of an existing depleted oil or gas well, casing perforations 210 may extend through the well casing wall 203 of the well casing 202. In implementation of the system 201, the casing perforations 210 may be closed or sealed off. In some embodiments, such as in the case of a well drilled for the dedicated purpose of the renewable geothermal energy harvesting systems and methods, the casing perforations 210 may be omitted.

A fluid flow conduit 276, such as a tubing string, for example and without limitation, may extend from the ground surface 220 into the well casing 202. The fluid flow conduit 276 may have a fluid flow conduit wall 277 with a proximal conduit end 278 disposed at or near the ground surface 220 and a distal conduit end 279 disposed in the well casing 202. The fluid flow conduit wall 277 may be fabricated of a material or combination of materials having a low specific heat or high thermal conductivity. In some embodiments, thermal insulation (not illustrated) may surround the fluid flow conduit wall 277 of the fluid flow conduit 276.

A well annulus 226 may be formed by and between the interior surface of the well casing wall 203 and the exterior surface of the fluid flow conduit 276. The distal conduit end 279 of the fluid flow conduit 276 may be open to establish fluid communication between the well annulus 226 and the conduit interior of the fluid flow conduit 276.

At least one wellhead 230 may be disposed in fluid communication with the proximal conduit end 278 of the fluid flow conduit 276 and the well annulus 226 at the ground surface 220. The wellhead 230 may facilitate fluid communication between the well annulus 226 and the fluid flow conduit 276 with at least some of the various functional components of the system 201, which will be hereinafter described. The wellhead 230 may include conduits and valves which facilitate controlled and regulated flow of the working fluid 254 throughout the system 201, which will be hereinafter described, as well as pressure gauges which indicate well pressures and the like.

At least one working fluid supply 252 may be configured to contain a supply of the working fluid 254. The working fluid 254 may include at least one refrigerant and/or other fluid or combination of fluids having a high specific heat or high boiling point. The working fluid supply 252 may be disposed in fluid communication with the well annulus 226 typically through at least one working fluid supply pump 268. Accordingly, as illustrated in FIG. 1, in some applications of the system 201, by operation of the working fluid supply pump 268, the working fluid 254 may pumped from the working fluid supply 252 into the well annulus 226 through a fluid introduction conduit 257 which may be connected to the wellhead 230. In some embodiments, the working fluid supply pump 268 may include an electric motor (not illustrated) which facilitates pumping of the working fluid 254 from the working fluid supply 252 through the fluid introduction conduit 257. In some embodiments, the working fluid supply pump 268 may be configured such that the kinetic energy of the flowing inlet gas stream 290 of natural gas in a natural gas pipeline 286 may substitute for the electric motor to provide the pumping of the working fluid 254 throughout the system 201, typically as will be hereinafter described.

At least one thermal application system 240 may be disposed in direct (without intermediary storage facilities) fluid communication with the fluid manifold 230, typically through at least one distribution conduit 242. The thermal application system 240 may be disposed in direct fluid communication with the wellhead 230 and may be configured to utilize the thermal energy. As used herein, "utilize the thermal energy" and like phrases mean that the thermal application system 240 is configured to use the thermal energy to perform work directly or to convert the thermal energy to electrical energy. The electrical energy may be used to perform work and/or stored for later use. For example and without limitation, in some embodiments, the thermal application system 240 may include at least one turbine and/or other system which utilizes the thermal energy harvested by the system 201 to perform work such as for electrical power generation, storage and/or other purposes, typically as will be hereinafter described. In some embodiments, the thermal application system 240 may include a heat gas cooling cycle system 250 which utilizes gas heat to cool fluids. For example and without limitation, in some embodiments, the heat gas cooling cycle system 250 may include a natural gas absorption cooling system which utilizes a cycle of condensation and evaporation using natural gas to produce cooling. The condensation and evaporation cycle of the absorption process may be driven by the heat captured from the subterranean geothermal formation 222. Absorption systems may be available as chillers or chiller/heaters and may be powered by the harvested heat. The heat gas cooling cycle system 250 may be particularly suitable for cooling commercial facilities such as supermarkets, hotels, warehouses, office buildings and institutions such as hospitals, nursing homes, churches, schools, factories and other industrial facilities, for example and without limitation.

In some embodiments, a natural gas pipeline 286 and a gas sale line 292 may be located in proximity to the system 201. The natural gas pipeline 286 may include a higher pressure natural gas line and/or a natural gas producing well. The routed natural gas pressured natural gas pipeline 286 may be connected to the inlet port 269 and the exhaust port 270 of the working fluid supply pump 268 in order to provide kinetic energy to the pump 268. Accordingly, only the kinetic energy from natural gas flowing from the natural gas pipeline 286 may be used to operate the working fluid supply pump 268. A fluid return conduit 244 may connect the working fluid supply 252 and/or the working fluid supply pump 268 to the thermal application system 240. Accordingly, in typical operation of the system 201, an inlet gas stream 290 of natural gas may flow from the natural gas pipeline 286 to the working fluid supply pump 268 through the inlet port 269. The kinetic energy from the flow pressure of the inlet gas stream 290 may operate the working fluid supply pump 268 of the working fluid supply 252. A return fluid stream 260 of the working fluid 254 may flow from the thermal application system 240 back to the working fluid supply pump 268 typically through the return fluid conduit 244. At the working fluid supply pump 268, the post-pump natural gas may be routed directly back to the natural gas pipeline 286 through the exhaust port 270, to the gas producing well and/or to the gas sale line 292 as a return gas stream 291. Accordingly, none of the natural gas is consumed or exhausted to the atmosphere. The inlet gas stream 290 may continue to flow from the natural gas pipeline 286 to the working fluid supply pump 268 for continued operation of the working fluid supply pump 268 and circulation of the working fluid 254 through the system 201.

In some embodiments, a recirculation conduit 236 may have an inlet end which is disposed in fluid communication with the fluid flow conduit 276 and an outlet end which is disposed in fluid communication with the well annulus 226, typically through the wellhead 230. A fluid recirculation pump 246 may be disposed in fluid communication with the recirculation conduit 236. The fluid recirculation pump 246 may be operable to pump the heated working fluid 254 from the proximal conduit end 278 of the fluid flow conduit 276 through the recirculation conduit 236 to the well annulus 226 to impart additional heating to the working fluid 254 prior to distribution of the working fluid 254 to the thermal application system 240.

As illustrated in FIG. 1, in typical application of the system 201, which will be hereinafter further described, a supply of the working fluid 254 may be placed in the working fluid supply 252. By operation of the working fluid supply pump 268, the working fluid 254 may be pumped from the working fluid supply 252 through the fluid introduction conduit 257 and wellhead 230, respectively, into the well annulus 226, and traverse at least a portion of the length of the well casing 202.

As the working fluid 254 flows through the well annulus 226 toward the distal casing end 206 of the well casing 202, thermal energy is transferred from the geothermal formation 222 through the well casing wall 203 to the working fluid 254.

As it approaches the distal casing end 206 of the well casing 202, the heated working fluid 254 may flow from the well annulus 226 and enter the fluid flow conduit 276 through the distal conduit end 279. The heated working fluid 254 flows from the distal conduit end 279 through the fluid flow conduit 277 to the proximal conduit end 278. As it flows through the fluid flow conduit 277, some thermal energy may be transferred from the working fluid 254 in the fluid flow conduit 277 to the working fluid 254 in the well annulus 226 to preheat the working fluid 254 in the well annulus 226.

The wellhead 230 may distribute at least one application stream of the heated working fluid 254 from the proximal conduit end 278 of the fluid flow conduit 276 typically through the distribution conduit 242 directly to the thermal application system 240. In some applications, the thermal energy from the application stream of the heated working fluid 254 may be used to drive at least one turbine and/or other thermal application at the thermal application system 240 for electrical power generation, storage and/or other purposes. For example and without limitation, in some applications, the thermal application system 240 may include a heat gas cooling system 250 which utilizes heat gas to cool fluids such as natural gas. The cooled fluids may be used for cooling commercial facilities such as supermarkets, hotels, warehouses, office buildings and institutions such as hospitals, nursing homes, churches, schools, factories and other industrial facilities, for example and without limitation.

Figure 3:
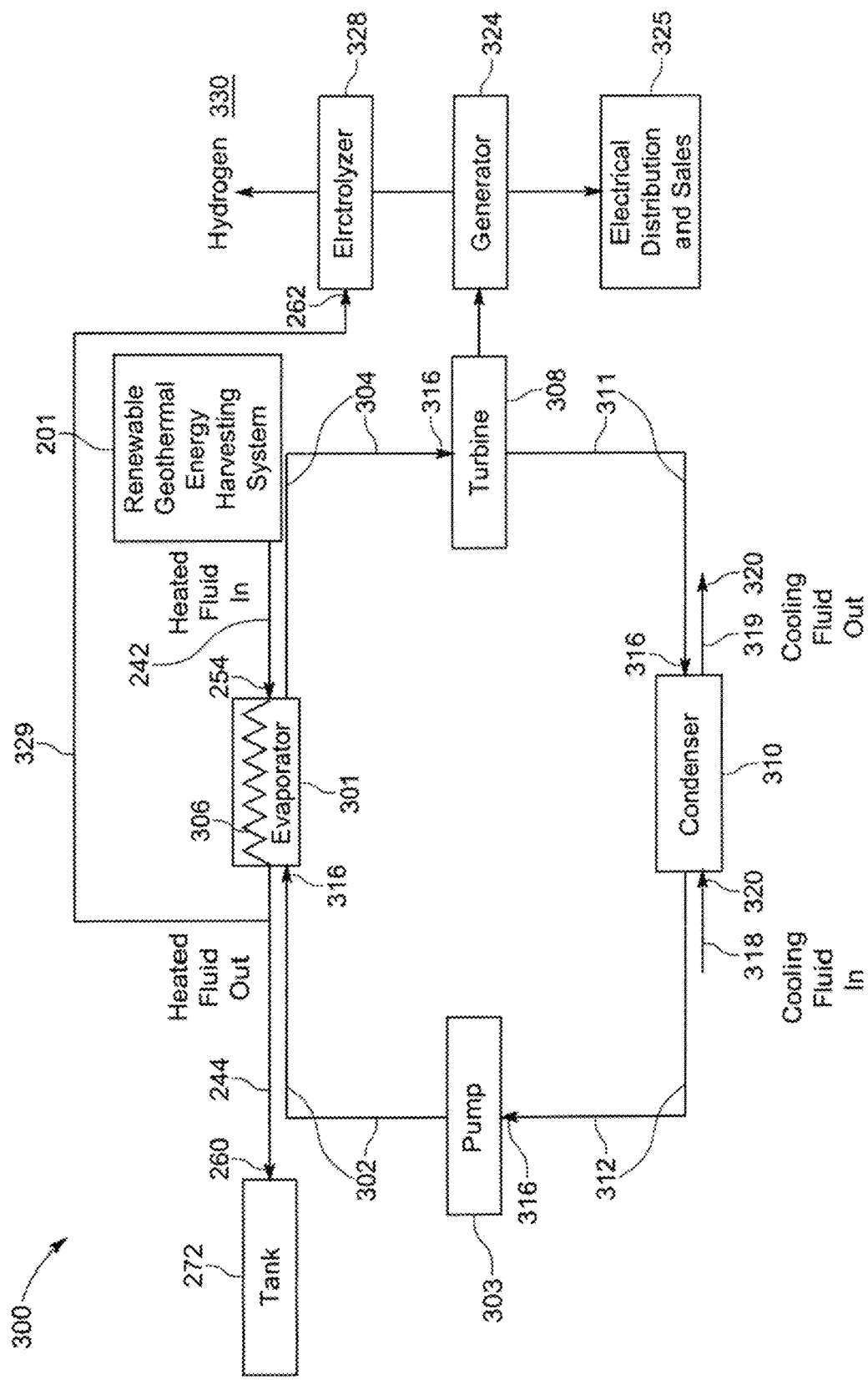
FIG. 3 is a functional block diagram of an illustrative embodiment of the renewable geothermal energy harvesting systems in typical application of the system in utilizing an organic rankine cycle system as a thermal application system.

As further illustrated in FIG. 1, in some applications, the thermal application system 240 may include at least one organic rankine cycle system 300. As illustrated in FIG. 3, the organic rankine cycle system 300 may be configured to implement an organic rankine cycle which utilizes the thermal energy in the heated working fluid 254 to generate electrical power via an electrical generator 324 and/or produce hydrogen 330 by electrolysis via an electrolyzer 328, for example and without limitation, typically as will be hereinafter described.

Figure 4:
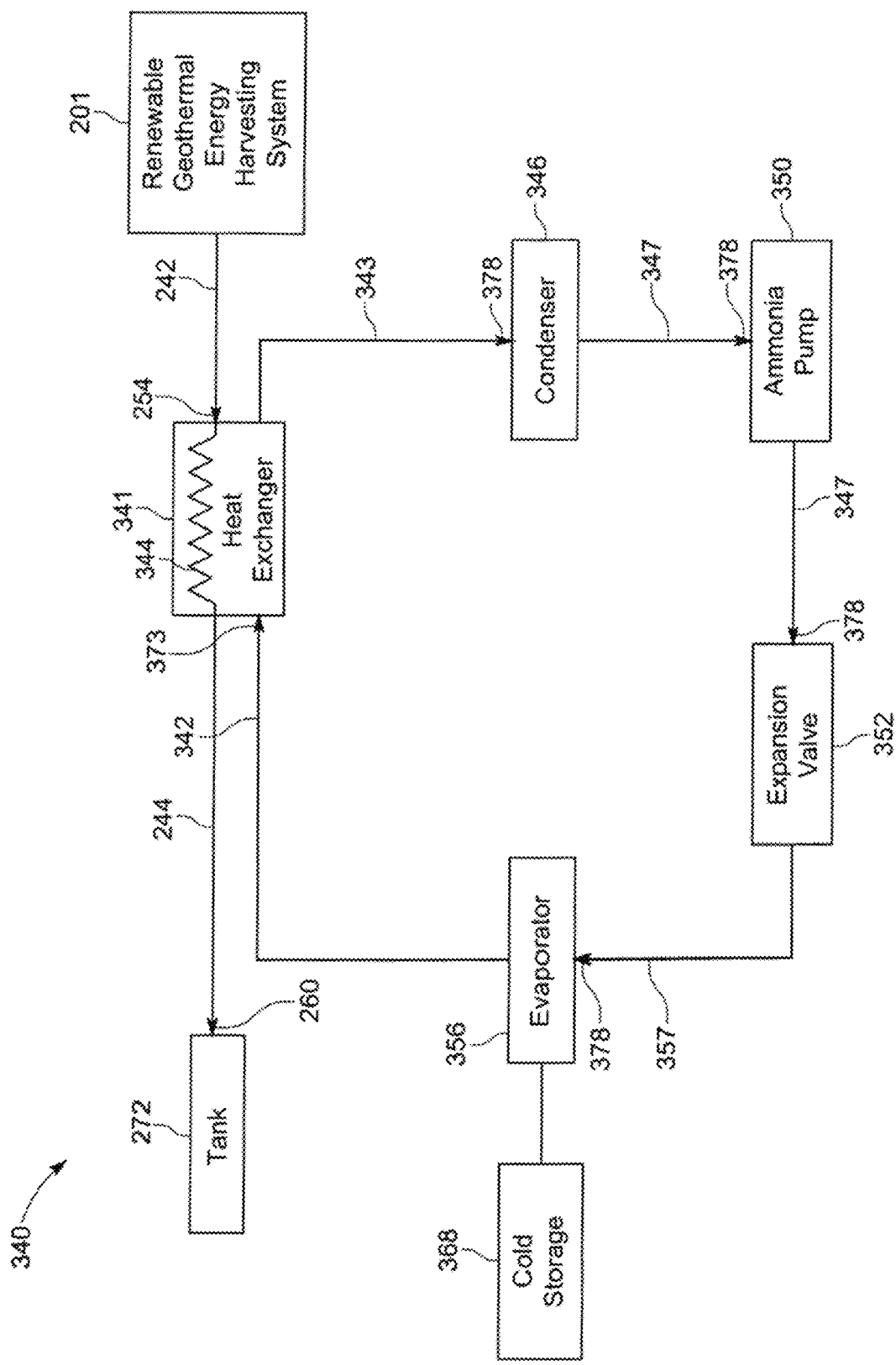
FIG. 4 is a functional block diagram of an alternative illustrative embodiment of the renewable geothermal energy harvesting systems in typical application of the system in utilizing an ammonia cycle system as a thermal application system.

As further illustrated in FIG. 1, in some applications, the thermal application system 240 may include at least one ammonia cycle system 340. As illustrated in FIG. 4, the ammonia cycle system 340 may utilize the thermal energy in the heated working fluid 254 to cool liquid ammonia 378. The cooled ammonia 378 may be used to cool and maintain a cold storage facility 368 for the cold storage of medical supplies, pharmaceuticals, food, and/or agricultural supplies, for example and without limitation.

As further illustrated in FIG. 1, in some applications, the thermal application system 240 may include at least one geothermal heating system 400. The geothermal heating system 400 may utilize the thermal energy in the heated working fluid 254 to heat a house and/or office building 410 (FIG. 5), an agricultural greenhouse 412 (FIG. 6), and/or a manufacturing facility 414 (FIG. 7), for example and without limitation.

As further illustrated in FIG. 1, in some applications, the wellhead 230 may distribute at least one recirculation stream 255 of the heated working fluid 254 from the proximal conduit end 278 of the fluid flow conduit 276 to the fluid recirculation pump 246 typically through the recirculation conduit 236. The fluid recirculation pump 246 may pump the recirculation stream 255 of the heated working fluid 254 back to the well annulus 226 typically through the recirculation conduit 236 and the wellhead 230, respectively. The recirculation stream 255 of the heated working fluid 254 may thus flow through the well annulus 226 toward the distal casting end 206 of the well casing 202 such that additional thermal energy is transferred from the geothermal formation 222 to the working fluid 254. The twice-heated working fluid 254 may then enter the distal conduit end 279 and flow through the fluid flow conduit 277 back to the wellhead 230. The twice-heated working fluid 254 may then be distributed as the application stream of the working fluid 254 directly to the thermal application system 240 for thermal transfer and utilization. Additionally, or alternatively, the recirculation stream 255 of the heated working fluid 254 may again be distributed from the wellhead 230 to the fluid recirculation pump 246 and recirculated a third time through the well annulus 226 and fluid flow conduit 276, respectively, for additional transfer of thermal energy from the geothermal formation 222 to the working fluid 254. The working fluid 254 may be recirculated in the foregoing manner as many times as is desired to achieve the selected target temperature of the working fluid 254 prior to distributing the application stream of the working fluid 254 to the thermal application system 240.

As particularly illustrated in FIG. 1, in some embodiments, the natural gas pipeline 286 may be disposed in fluid communication with the working fluid supply pump 268. The gas sale line 292 may be connected to the working fluid supply 252 and/or directly to the working fluid supply pump 268, as illustrated. A fluid return conduit 244 may connect the thermal application system 240 to the working fluid supply 252 and/or the pump 260. In some embodiments, at least one tank 272 may be provided in the fluid return conduit 244. Accordingly, in typical operation of the system 201, the inlet gas stream 290 of natural gas may flow from the natural gas pipeline 286 to the working fluid supply pump 268. The kinetic energy from the flow pressure of the inlet gas stream 290 may operate the working fluid supply pump 268 of the working fluid supply 252 in lieu of using the electric motor to operate the pump 268. The return fluid stream 260 of the working fluid 254 may flow from the thermal application system 240 back to the working fluid supply 252 and/or the working fluid supply pump 268. From the working fluid supply pump 268, the natural gas may be routed to the gas producing well, pipeline and/or gas sale line 292 as the return gas stream 291. The inlet gas stream 290 may continue to flow from the natural gas pipeline 286 typically through the gas inlet conduit 287 for continued operation of the working fluid supply pump 268 and circulation of the working fluid 254 through the system 201.

Figure 2:
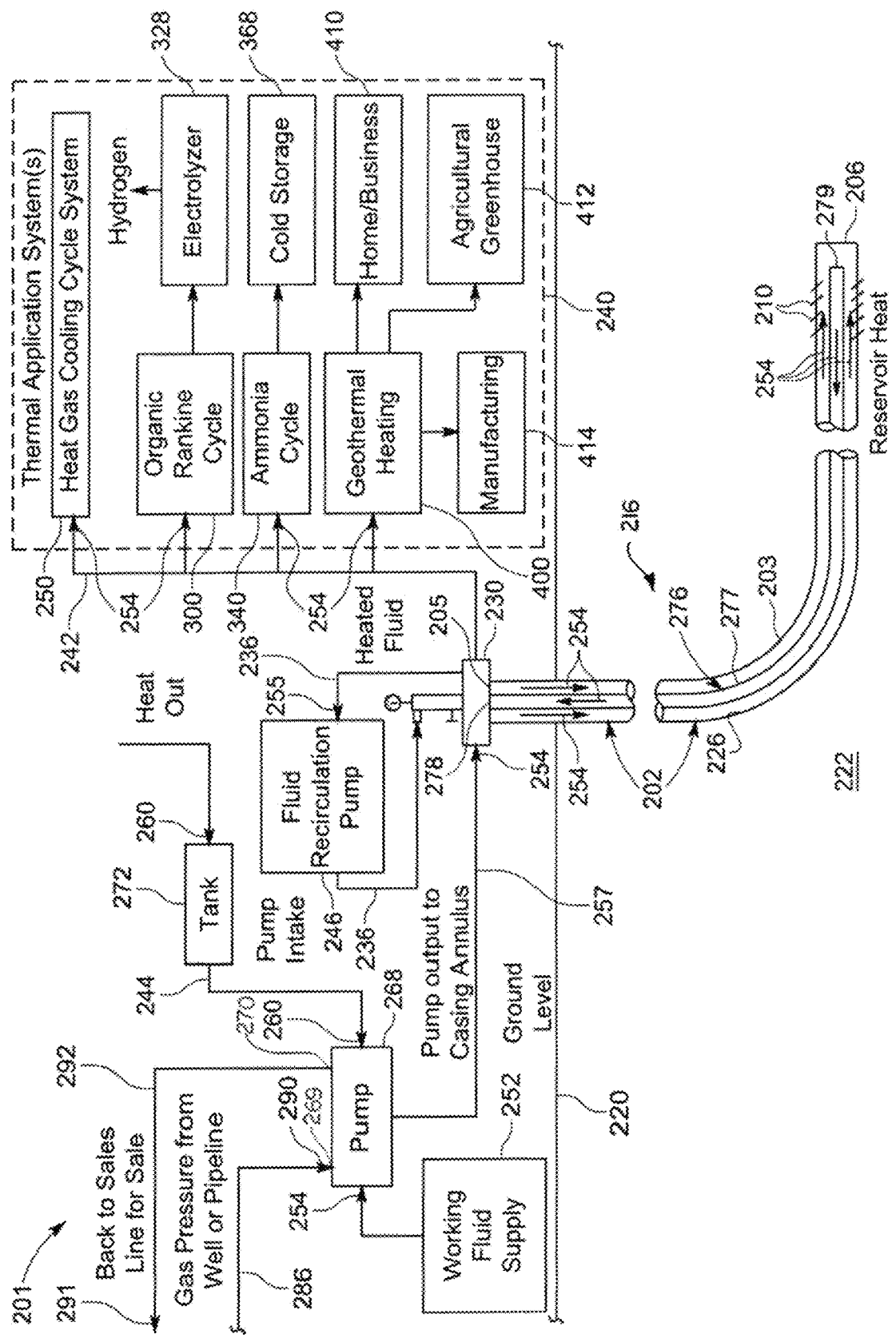
FIG. 2 is a functional block diagram of an alternative illustrative embodiment of the renewable geothermal energy harvesting systems, in which a working fluid flows first through the fluid flow conduit and then through the well annulus as it absorbs thermal energy from the geothermal formation.

As illustrated in FIG. 2, in an alternative application of the system 201, the working fluid 254 may be pumped from the working fluid supply 252 and/or the working fluid supply pump 268 to the fluid flow conduit 276 typically through the fluid introduction conduit 257 and the wellhead 230, respectively. The working fluid 254 may then flow through the fluid flow conduit 276, discharging into the well annulus 226 at the distal conduit end 279 of the fluid flow conduit 276. As it subsequently flows through the well annulus 226 back toward the ground surface 220, the working fluid 254 may be heated by transfer of thermal energy from the geothermal formation 222. Some thermal energy may be transferred from the heated working fluid 254 in the well annulus 226 to the preheated working fluid 254 in the fluid flow conduit 276. As the heated working fluid 254 is discharged from the proximal casing end 205 of the well casing 202, the wellhead 230 may distribute the application stream of the heated working fluid 254 directly to the thermal application system 240 typically through the distribution conduit 242.

As further illustrated in FIG. 2, in some applications, the wellhead 230 may distribute the recirculation stream 255 of the heated working fluid 254 from the well annulus 226 to the fluid recirculation pump 246 typically through the pump inlet conduit 247. The fluid recirculation pump 246 may pump the recirculation stream 255 back into the fluid flow conduit 276 for additional transfer of thermal energy from the geothermal formation 222 to the working fluid 254 before distribution of the application stream of the heated working fluid 254 to the thermal application system 240. The working fluid 254 may be recirculated in the foregoing manner as many times as is desired to achieve the selected temperature of the working fluid 254 prior to distributing the application stream of the working fluid 254 to the thermal application system 240.

Referring next to FIG. 3 of the drawings, in some embodiments, the thermal application system 240 may include the organic rankine cycle system 300. The organic rankine cycle system 300 may utilize the thermal heat of the heated working fluid 254 in an organic rankine cycle to generate electrical power via the electrical generator 324. Accordingly, the organic rankine cycle system 300 may include an evaporator 301. The evaporator 301 may provide the intersection point between the closed loop of the system 201 and the closed loop of the organic rankine cycle 300. The distribution conduit 242 and the fluid return conduit 244 of the renewable geothermal energy harvesting system 201 may be disposed in fluid communication with the evaporator 301. Accordingly, the evaporator 301 may be configured to accommodate flow of the heated working fluid 254 as the heated working fluid 254 flows from the distribution conduit 242 to the fluid return conduit 244.

An evaporator inlet line 302 and an evaporator outlet line 304 may be disposed in fluid communication with the evaporator 301. The evaporator 301 may be configured to accommodate flow of a cycle fluid 316 as the cycle fluid 316 flows from the evaporator inlet line 302 to the evaporator outlet line 304. The evaporator 301 may include a heat-transmissible fluid barrier (not illustrated) which separates the fluid flow paths of the heated working fluid 254 and the cycle fluid 316 through the evaporator 301. In some embodiments, the evaporator 301 may include a heat-transmissible spiral conduit 306 which is disposed in fluid communication with the distribution conduit 242 and the fluid return conduit 244.

Accordingly, the evaporator 301 may be configured to facilitate transfer of thermal energy from the heated working fluid 254 to the cycle fluid 316 as the heated working fluid 254 flows through the spiral conduit 316 in the evaporator 301 and the cycle fluid 316 flows through the evaporator 301 typically in opposite directions on respective sides of the heat-transmissible barrier or the wall of the spiral conduit 316.

The cycle fluid 316 may include at least one volatile fluid having an evaporation temperature which is lower than or equal to the temperature of the heated working fluid 254. The constitution and characteristics of the cycle fluid 316 may be selected such that the cycle fluid 316 evaporates, or changes from the fluid phase to the gaseous phase, as it traverses the evaporator 301 from the evaporator inlet line 302 to the evaporator outlet line 304. The cycle fluid 316 is typically an organic, high molecular mass fluid with a liquid-vapor phase change, or boiling point, occurring at a lower temperature than the water-steam phase change. Fluids having characteristics which are optimal for the cycle fluid 316 may include fluids which exhibit an isentropic saturation vapor curve and have a low freezing point, high stability temperature, high heat of vaporization and density, low environmental impact, safety, good availability, low cost, and acceptable pressures. Non-limiting examples of fluids which may be suitable for the cycle fluid 316 may include CFCs, HCFCs, HFCs, HCs, and PFCs.

A cycle fluid pump 303 may have an outlet which is disposed in fluid communication with the evaporator 301 through the evaporator inlet line 302. A condenser 310 may be disposed in fluid communication with an inlet of the cycle fluid pump 303 typically through a condenser outlet line 312. A condenser inlet line 311 may be disposed in fluid communication with the condenser 310. The condenser 310 may facilitate flow of the cycle fluid 316 as the cycle fluid 316 flows from the condenser inlet line 311 to the condenser outlet line 312.

A cooling fluid inlet line 318 and a cooling fluid outlet line 319 may be disposed in fluid communication with the condenser 310. The cooling fluid inlet line 318 and the cooling fluid outlet line 319 may facilitate flow of a cooling fluid 320 into and out of, respectively, the condenser 310. The condenser 310 may be configured to condense the cycle fluid 316 from the gaseous state back to the liquid state as the cooling fluid 320 flows from the condenser inlet line 311, through the condenser 310 to the condenser outlet line 312 and absorbs thermal energy from the cycle fluid 316 in the condenser 310.

At least one turbine 308 may have an inlet which is disposed in fluid communication with the evaporator outlet line 304 and an outlet which is disposed in fluid communication with the condenser inlet line 311. The turbine 308 may be configured to convert thermal energy into rotational mechanical energy as the heated gaseous cycle fluid 316 flows from the evaporator outlet line 304 to the condenser inlet line 311, typically in the conventional manner. At least one electrical generator 324 may be drivingly engaged by the turbine 308. The electrical generator 324 may be configured to convert the rotational mechanical energy of the turbine 308 into electrical energy, typically in the conventional manner.

In some embodiments, an electrical distribution and sales system or network 325 may electrically interface with the electrical generator 324. Accordingly, electrical power which is generated by the electrical generator 324 may be distributed to the electrical distribution and sales system or network 325 for sales, distribution, and use.

In some embodiments, an electrolyzer 328 may electrically interface with the electrical generator 324. The electrolyzer 328 may be disposed in fluid communication with the fluid return conduit 244, such as through a fluid diversion line 329. The fluid diversion line 329 may be configured to divert at least a portion of the return fluid stream 260 of the working fluid 254 from the fluid return conduit 244 to the electrolyzer 328. Accordingly, the electrolyzer 328 may be configured to generate gaseous hydrogen 330 from water in the diverted working fluid stream 262 by electrical input from the electrical generator 324. The hydrogen 330 may be stored in a suitable hydrogen storage facility (not illustrated) for ultimate distribution and use. In some embodiments, the electrolyzer 328 may be configured to receive a water source other than or in addition to that of the return fluid stream 260 in the fluid return conduit 244 for electrolysis and generation of the hydrogen 330.

In typical utilization of the organic rankine cycle system 300 as the thermal application system 240, the renewable geothermal energy harvesting system 201 may be operated as was heretofore described with respect to FIGS. 1 and 2. In some applications, the fluid recirculation pump 246 may be utilized to heat the working fluid 254 a selected number of times prior to distribution of the heated working fluid 254 to the organic rankine cycle system 300 to achieve a desired target temperature of the heated working fluid 254.

As illustrated in FIG. 3, the heated working fluid 254 may flow from the renewable geothermal energy harvesting system 201 through the distribution conduit 242 to the evaporator 301 of the organic rankine cycle system 300. The heated working fluid 254 may flow through the evaporator 301 to the fluid return conduit 244, and then through the tank 272 and back to the working fluid supply pump 268 (FIG. 1) of the renewable geothermal energy harvesting system 201. The working fluid supply pump 268 may continually recirculate the working fluid 254 through the system 201 to the evaporator 301 of the organic ranking cycle system 300.

As the heated working fluid 254 flows typically through the spiral conduit 306 in the evaporator 301, the cycle fluid pump 303 of the organic rankine cycle system 300 may pump the liquid cycle fluid 316 through the evaporator 301 outside or exterior to the spiral conduit 306. Accordingly, in the evaporator 301, thermal energy may be transferred from the heated working fluid 254 through the wall of the spiral conduit 306 to the cycle fluid 316 such that the liquid cycle fluid 316 evaporates and becomes gaseous cycle fluid 316. The gaseous cycle fluid 316 may flow from the evaporator 301 to the turbine 308, typically through the evaporator outlet line 304. The turbine 308 may convert the thermal energy of the gaseous cycle fluid 316 to rotational mechanical energy which drives the electrical generator 324.

In some applications, the electrical generator 324 may generate electrical current which may be distributed to the electrical distribution and sales system or network 325. The electrical distribution and sales system or network 325 may distribute the electrical current for distribution, sales, and use. Additionally or alternatively, at least a portion of the electrical current generated by the electrical generator 324 may be distributed to the electrolyzer 328. The diverted working fluid stream 262 may be diverted from the fluid return conduit 244 to the electrolyzer 328. The electrolyzer 328 may use electrolysis to produce the hydrogen gas 330 from water in the diverted working fluid stream 262. The hydrogen 330 may be stored in a suitable hydrogen storage facility (not illustrated) for ultimate distribution and use. In some embodiments, the electrolyzer 328 may receive water from a water source other than or in addition to that of the return fluid stream 260 in the fluid return conduit 244.

The gaseous cycle fluid 316 may flow from the turbine 308 to the condenser 310 through the condenser inlet line 311. As it flows through the condenser 310, the cooling fluid 320 may flow from the cooling fluid inlet line 318 through the condenser 310 to the cooling fluid outlet line 319. Thermal energy is transferred from the gaseous cycle fluid 316 to the cooling fluid 320 such that the gaseous cycle fluid 316 becomes liquid and returns to the cycle fluid pump 303 typically through the condenser outlet line 312. The liquid cycle fluid 316 may return through the condenser outlet line 312 to the cycle fluid pump 303, which may continue to pump the liquid cycle fluid 316 to the evaporator 301 through the evaporator inlet line 302, and the cycle repeats.

Referring next to FIG. 4 of the drawings, in some embodiments, the thermal application system 240 (FIG. 1) may include the ammonia cycle system 340. The ammonia cycle system 340 may utilize the thermal heat of the heated working fluid 254 in an ammonia cycle to cool liquid ammonia 378 and transition the liquid ammonia 378 to gaseous ammonia. As it changes phases from the liquid phase to the gas phase, the ammonia 378 may be used to cool and maintain a cold storage facility 368 for the cold storage of medical supplies, pharmaceuticals, food, and/or agricultural supplies, for example and without limitation.

The ammonia cycle system 340 may include a heat exchanger 341. The heat exchanger 341 may provide the intersection point between the closed loop of the system 201 and the closed loop of the ammonia cycle 340. The distribution conduit 242 and the fluid return conduit 244 of the renewable geothermal energy harvesting system 201 may be disposed in fluid communication with the heat exchanger 341. Accordingly, the heat exchanger 341 may be configured to accommodate flow of the heated working fluid 254 as the heated working fluid 254 flows from the distribution conduit 242 to the fluid return conduit 244.

An evaporator 356 and a condenser 346 may be disposed in fluid communication with the heat exchanger 341 typically through a heat exchanger inlet line 342 and a condenser inlet line 343, respectively. The heat exchanger 341 may be configured to accommodate flow of the gaseous ammonia 378 as the gaseous ammonia 378 flows from the evaporator 356 through the heat exchanger inlet line 342 to the condenser inlet line 343. The heat exchanger 341 may include a heat-transmissible fluid barrier (not illustrated) which separates the fluid flow paths of the heated working fluid 254 and the gaseous ammonia 378 through the heat exchanger 341. In some embodiments, the heat exchanger 341 may include a heat-transmissible spiral conduit 344 which is disposed in fluid communication with the distribution conduit 242 and the fluid return conduit 244. Accordingly, the heat exchanger 341 may be configured to facilitate transfer of thermal energy from the heated working fluid 254 to the gaseous ammonia 378 as the heated working fluid 254 flows typically through the spiral conduit 344 and the gaseous ammonia 378 flows through the heat exchanger 341 typically outside or exterior to the spiral conduit 344 in opposite directions.

The condenser 346 may be configured to condense the heated gaseous ammonia 378 from the heat exchanger 341 from the gaseous phase to the liquid phase as the phase-changing ammonia 378 releases thermal energy. The condenser 346 may include condenser coils (not illustrated) through which the ammonia 378 flows. The condenser 346 may additionally include at least one fan or other air flow device (not illustrated) which directs flow of air across the condenser coils. Accordingly, the gaseous ammonia 378 may undergo phase change to the liquid ammonia 378 as the ammonia 378 flows through the condenser coils and releases heat and the air flowing across the condenser coils carries the released heat away from the condenser coils.

An expansion valve 352 may be disposed in fluid communication with the condenser 346 and with the evaporator 356, typically through an expansion valve inlet line 347. The evaporator 356 may be disposed in fluid communication with the expansion valve 352, typically through an evaporator inlet line 357. The expansion valve 352 may be configured to reduce the pressure of the liquid ammonia 378 before the liquid ammonia 378 flows into the evaporator 356.

The ammonia cycle system 340 may include at least one ammonia pump 350. For example and without limitation, in some embodiments, the ammonia pump 350 may be provided in the expansion valve inlet line 347 in fluid communication with the condenser 346 and the expansion valve 352, as illustrated. The ammonia pump 350 may be configured to pump the liquid and gaseous ammonia 378 throughout the ammonia cycle system 340 as the ammonia 378 traverses the heat exchanger 341, the condenser 346, the expansion valve 352, and the evaporator 356.

The cold storage facility 368 may be disposed in thermal contact with the evaporator 356. For example and without limitation, in some embodiments, the evaporator 356 may be provided inside the cold storage facility 368 and/or may be provided in fluid contact with cooling coils (not illustrated) which run throughout the walls of the cold storage facility 368. As the liquid ammonia 378 transitions from the liquid phase to the gaseous phase in the evaporator 356, the cooling coils in the cold storage facility 368 may cool the cold storage facility 368 to a desired target temperature and maintain the cold storage facility 368 at the target temperature. The gaseous ammonia 378 may flow from the evaporator 356 to the heat exchanger 341 through the heat exchanger inlet line 342, and the cycle repeats.

Figure 5:
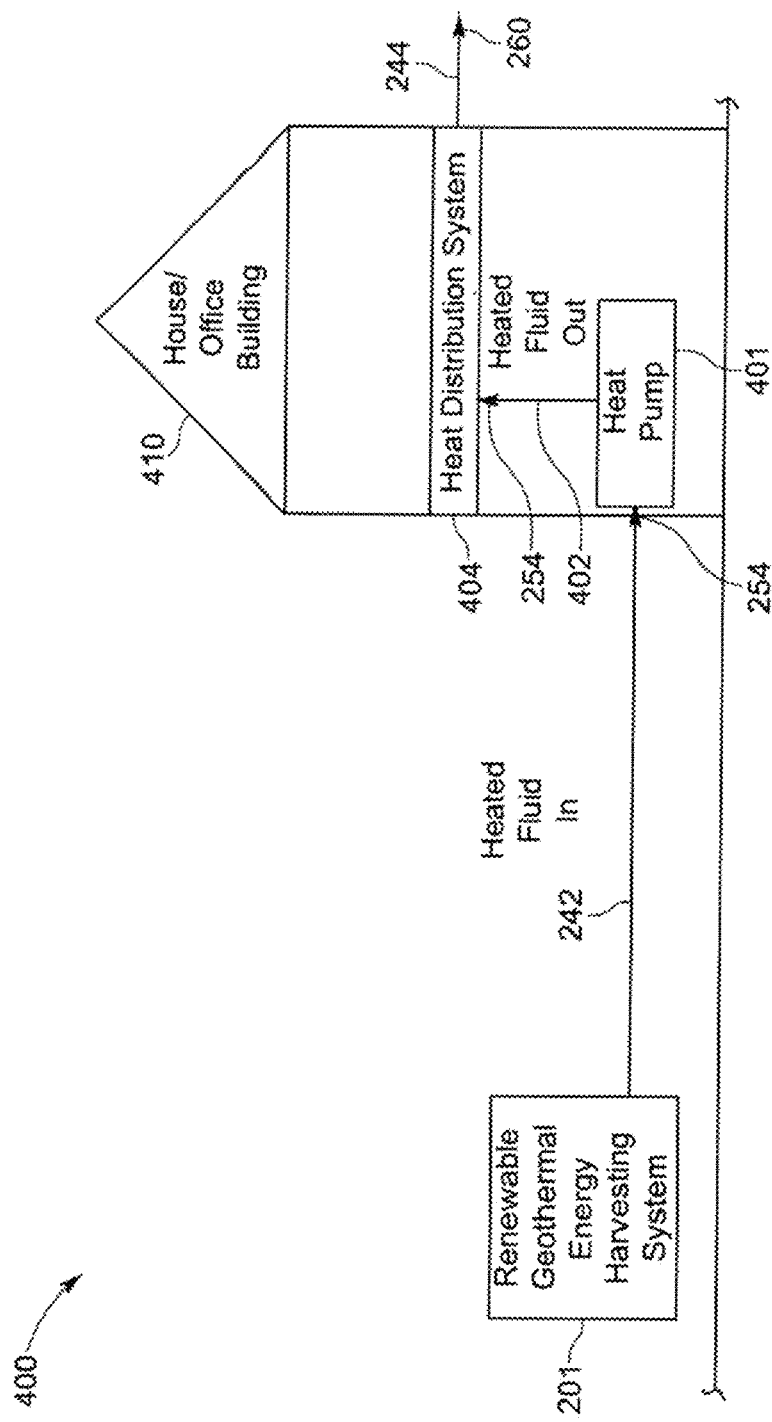
FIG. 5 is a functional block diagram of an alternative illustrative embodiment of the renewable geothermal energy harvesting systems in typical application of the system in a geothermal heating application, more particularly illustrating typical provision of heat to a house or an office building.

Referring next to FIG. 5 of the drawings, in some embodiments, the thermal application system 240 (FIG. 1) may include the geothermal heating system 400. The geothermal heating system 400 may utilize the thermal heat of the heated working fluid 254 from the renewable geothermal energy harvesting system 201 to heat a house or office building 410. Accordingly, a heat pump 401 may be disposed in fluid communication with the distribution conduit 242 from the renewable geothermal energy harvesting system 201. In some embodiments, the heat pump 401 may be provided inside, adjacent to or in other proximity to the house or office building 410. A heat distribution system 404 may be disposed in fluid communication with the heat pump 401, such as through a pump outlet line 402. The heat distribution system 404 may include components such as conduits, heat exchangers, air flow devices, ducts, vents and the like which facilitate distribution of heat throughout the house or office building 410, or which target the heat to one or more areas or components in the house or office building 410, typically according to the knowledge of those skilled in the art. The working fluid supply pump 268 may facilitate flow of the working fluid 254 into contact with the geothermal formation 222 and to the house or office building 410. At the house or office building 410, the heat pump 401 may be configured to pump the heated working fluid 254 from the distribution conduit 242 to the heat distribution system 404, in which thermal energy is dissipated or transferred from the heated working fluid 254 to the heat distribution system 404.

In some embodiments, the fluid return conduit 244 may be provided in fluid communication with the heat distribution system 404. The fluid return conduit 244 may be configured to distribute the return fluid stream 260 back to the renewable geothermal energy harvesting system 201, typically through the tank 272 (FIG. 1), after dissipation of the thermal energy from the heated working fluid 254 in the heat distribution system 404.

Figure 6:
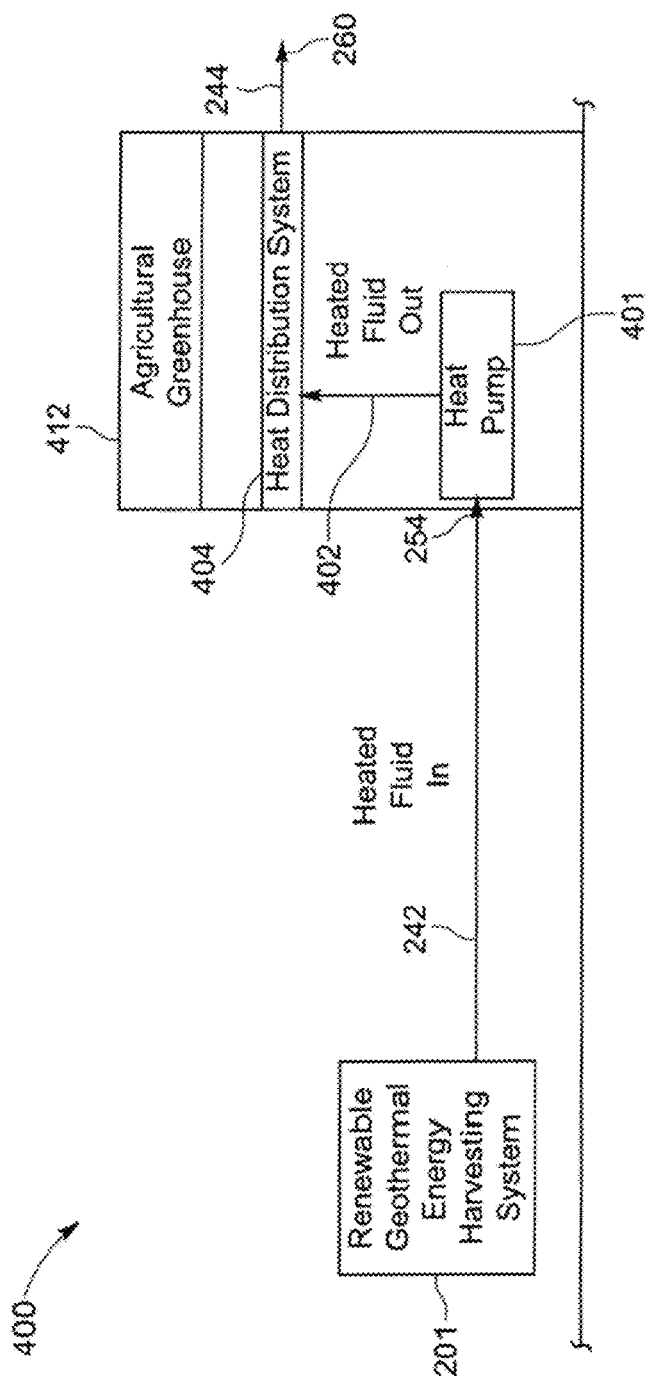
FIG. 6 is a functional block diagram of an alternative illustrative embodiment of the renewable geothermal energy harvesting systems in typical application of the system in a geothermal heating application, more particularly illustrating typical provision of heat to an agricultural greenhouse.

Referring next to FIG. 6 of the drawings, in some embodiments, the thermal application system 240 may include the geothermal heating system 400 which may utilize the thermal heat of the heated working fluid 254 from the renewable geothermal energy harvesting system 201 to heat an agricultural greenhouse 412. Accordingly, a heat pump 401 may be disposed in fluid communication with the distribution conduit 242 from the renewable geothermal energy harvesting system 201. In some embodiments, the heat pump 401 may be provided inside, adjacent to or in other proximity to the agricultural greenhouse 412. A heat distribution system 404 may be disposed in fluid communication with the heat pump 401, such as through a pump outlet line 402. The heat distribution system 404 may include components such as conduits, heat exchangers, air flow devices, ducts, vents and the like which facilitate distribution of heat throughout the greenhouse 412, or which target the heat to one or more areas or components in the greenhouse 412, typically according to the knowledge of those skilled in the art. The working fluid supply pump 268 may facilitate flow of the working fluid 254 into contact with the geothermal formation 222 and to the greenhouse 412. At the greenhouse 412, the heat pump 401 may be configured to pump the heated working fluid 254 from the distribution conduit 242 to the heat distribution system 404, in which thermal energy is dissipated or transferred from the heated working fluid 254 to the heat distribution system 404. In some embodiments, the fluid return conduit 244 may be provided in fluid communication with the heat distribution system 404 to distribute the return fluid stream 260 back to the renewable geothermal energy harvesting system 201, typically through the tank 272 (FIG. 1).

Figure 7:
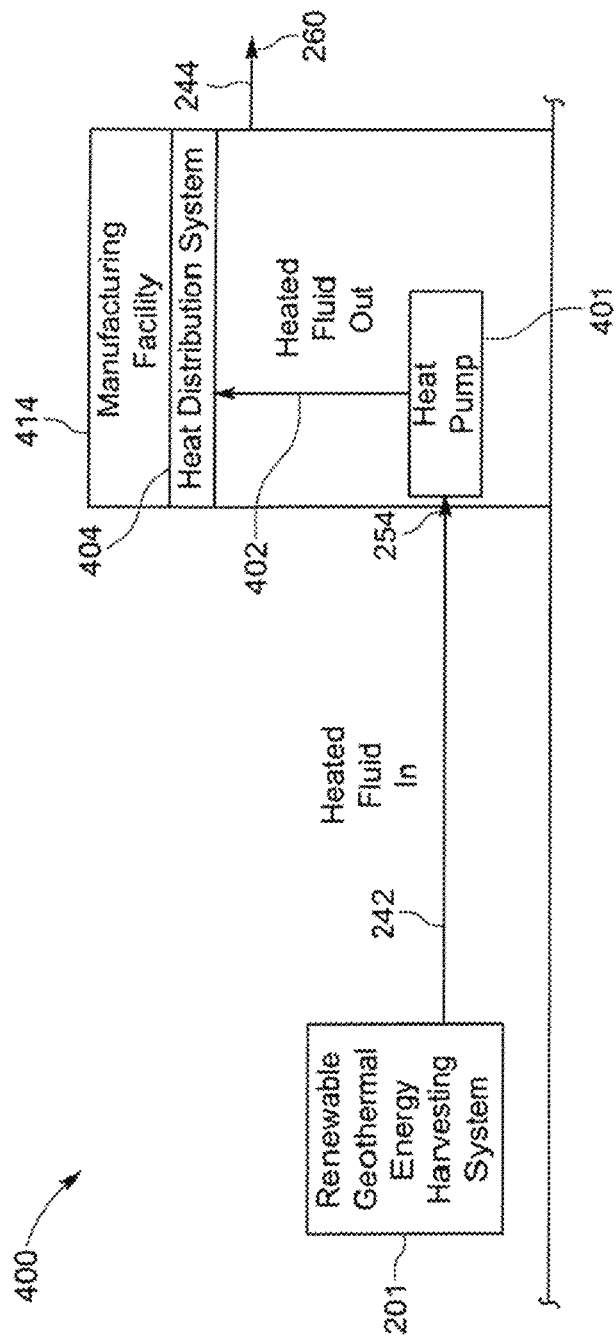
FIG. 7 is a functional block diagram of an alternative illustrative embodiment of the renewable geothermal energy harvesting systems in typical application of the system in a geothermal heating application, more particularly illustrating typical provision of heat to a manufacturing facility.

Referring next to FIG. 7 of the drawings, in some embodiments, the thermal application system 240 (FIG. 1) may include the geothermal heating system 400 which may utilize the thermal heat of the heated working fluid 254 from the renewable geothermal energy harvesting system 201 to provide heat to a manufacturing facility 414. Accordingly, a heat pump 401 may be disposed in fluid communication with the distribution conduit 242 from the renewable geothermal energy harvesting system 201. In some embodiments, the heat pump 401 may be provided inside, adjacent to or in other proximity to the manufacturing facility 414. A heat distribution system 404 may be disposed in fluid communication with the heat pump 401, such as through a pump outlet line 402. The heat distribution system 404 may include components such as conduits, heat exchangers, air flow devices, ducts, vents and the like which facilitate distribution of heat throughout the manufacturing facility 414, or which target the heat to one or more areas or components in the manufacturing facility 414, typically according to the knowledge of those skilled in the art. The working fluid supply pump 268 may facilitate flow of the working fluid 254 into contact with the geothermal formation 222 and to the manufacturing facility 414. At the manufacturing facility 414, the heat pump 401 may be configured to pump the heated working fluid 254 from the distribution conduit 242 to the heat distribution system 404, in which thermal energy is dissipated or transferred from the heated working fluid 254 to the heat distribution system 404. In some embodiments, the fluid return conduit 244 may be provided in fluid communication with the heat distribution system 404 to distribute the return fluid stream 260 back to the renewable geothermal energy harvesting system 201, typically through the tank 272 (FIG. 1).

Figure 8:
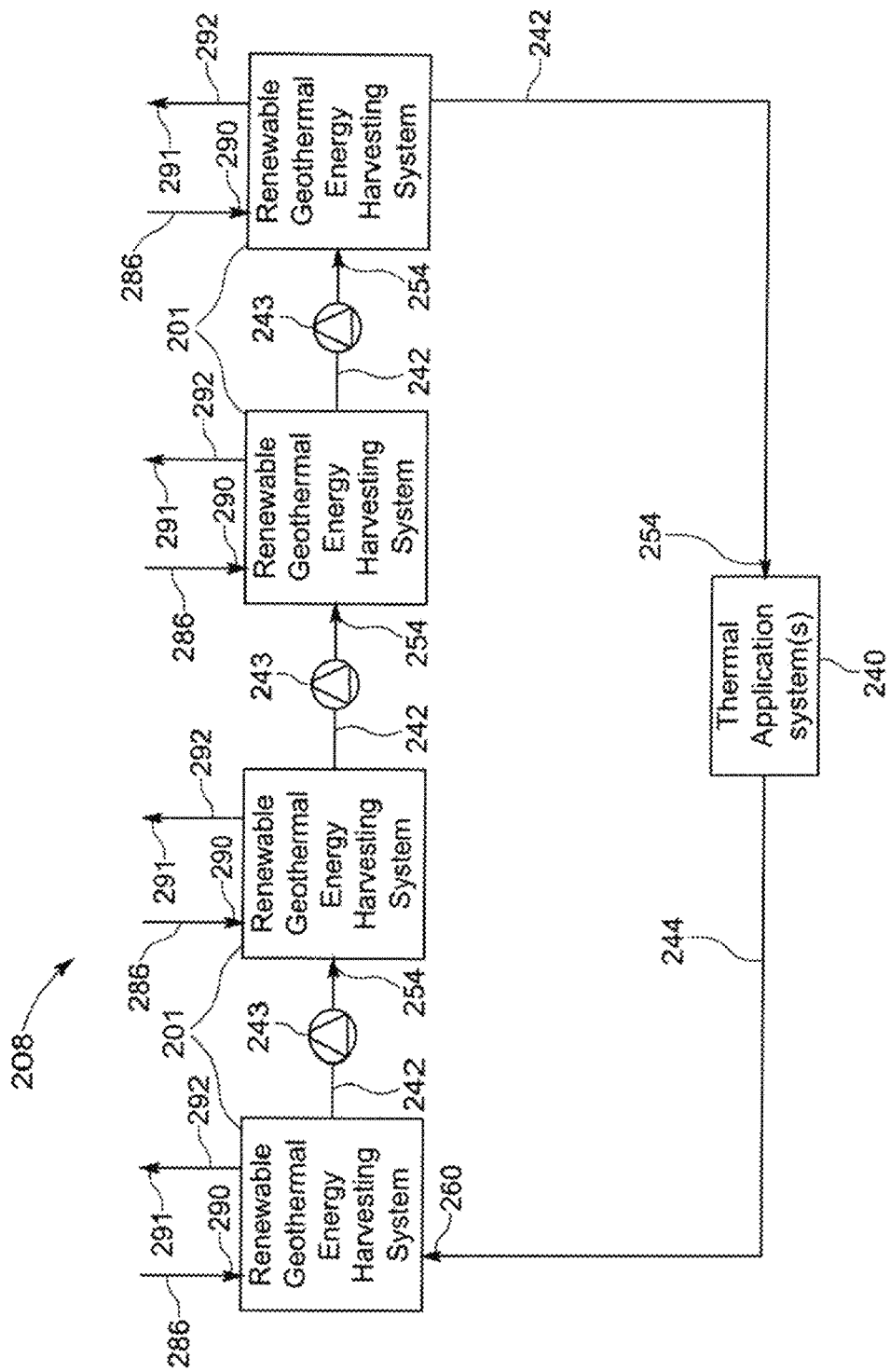
FIG. 8 is a functional block diagram illustrating multiple renewable geothermal energy harvesting systems serially connected to each other to form a system series in some applications of the systems.

Referring next to FIG. 8 of the drawings, in some embodiments, multiple renewable geothermal energy harvesting systems 201 may be serially connected to each other to form a system series 208. The system series 208 may achieve an amplification or augmentation effect which amplifies or augments the heat and/or volume of the heated working fluid 254 for large-scale or specialized applications. Accordingly, each renewable geothermal energy harvesting system 201 may be connected to the previous renewable geothermal energy harvesting system 201 in the system series 208 via the distribution conduit 242 of the previous renewable geothermal energy harvesting system 201. The distribution conduit 242 of each system 201 may be disposed in fluid communication with the working fluid supply pump 268 (FIG. 1) of the next system 201 in the series. At least one pump 243 may be provided in each distribution conduit 242 to pump the heated working fluid 254 from each system 201 to the next system 201 in the system series 208. The distribution conduit 242 which extends from the last or terminal system 201 in the system series 208 may be disposed in fluid communication with the thermal application system 240. The thermal application system 240 may include any application in which the thermal energy in the heated working fluid 254 is harvested and utilized to perform work. For example and without limitation, in some embodiments, the thermal application system 240 may include the heat gas cooling cycle system 250, the organic rankine cycle 300, the ammonia cycle 340, or the geothermal heating system 400, each of which was heretofore described with respect to FIGS. 1-7, or combinations thereof. The sizes of the distribution conduits 242, fluid return conduit 244 and other components of the system series 208 may be selected to accommodate the progressively larger volume of the working fluid 254 as the working fluid 254 is successively distributed through and between the systems 201.

In typical application of the system series 208, each system 201 may be operated to form the heated working fluid 254, typically as was heretofore described with respect to FIGS. 1 and 2. Each system 201 may distribute its heated working fluid 254 to the next system 201 in the system series 208. Accordingly, the heated working fluid 254 from the first system 201 in the system series 208 may be distributed through the distribution conduit 242 of the first system 201 to the working fluid supply pump 268 (FIG. 1) of the second system 201 in the system series 208. The heated working fluid 254 may be subsequently heated again by operation of the second system 201 in the system series 208. The twice-heated working fluid 254 may then be distributed from the second system 201 to the third system 201 in the system series 208, where the working fluid 254 is heated by operation of the third system 201 before the thrice-heated working fluid 254 is distributed to the fourth system 201 in the system series 208, and so on. The working fluid 254, serially heated by operation of the successive systems 201 in the system series 208, may then be distributed through the distribution conduit 242 of the final system 201 in the system series 208 to the thermal application system or systems 240. After the thermal energy is transferred from the multi-heated working fluid 254 to perform work at the thermal application system(s) 240, the return fluid stream 260 of the working fluid 254 may be distributed from the thermal application system(s) 240 to the first system 201 in the system series 208, typically through the fluid return conduit 244.

Figure 9:
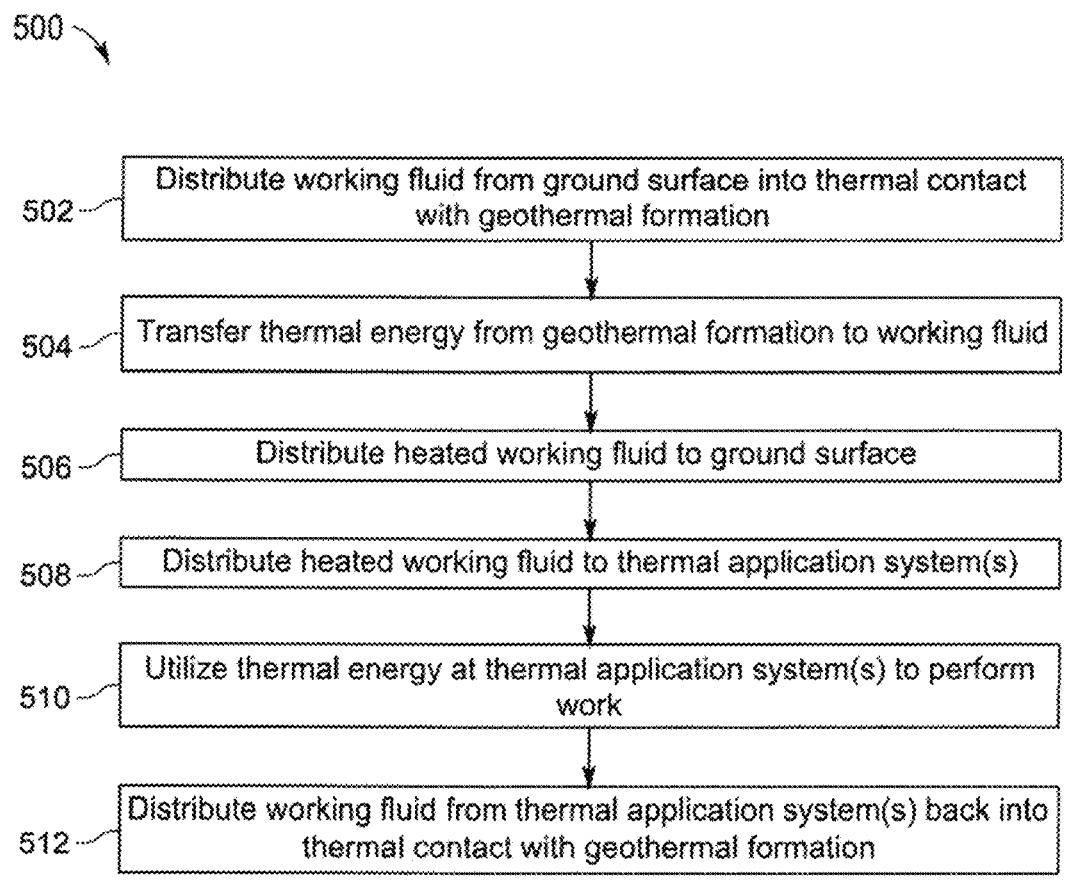
FIG. 9 is a flow diagram of an illustrative embodiment of the renewable geothermal energy harvesting methods.

Referring next to FIG. 9 of the drawings, a flow diagram of an illustrative embodiment of the renewable geothermal energy harvesting methods is generally indicated by reference numeral 500. At Step 502, at least one working fluid may be distributed from a ground surface into thermal contact with at least one subterranean geothermal formation.

At Step 504, thermal energy may be transferred from the geothermal formation to the working fluid.

At Step 506, the heated working fluid may be distributed to the ground surface.

At Step 508, the heated working fluid may be distributed to at least one thermal application system.

At Step 510, the thermal energy may be utilized at the thermal application system(s) to perform work.

At Step 512, the working fluid may be distributed from the thermal application system(s) back into thermal contact with the geothermal formation. Steps 504-510 may subsequently be repeated in a continuous loop.

Figure 10:
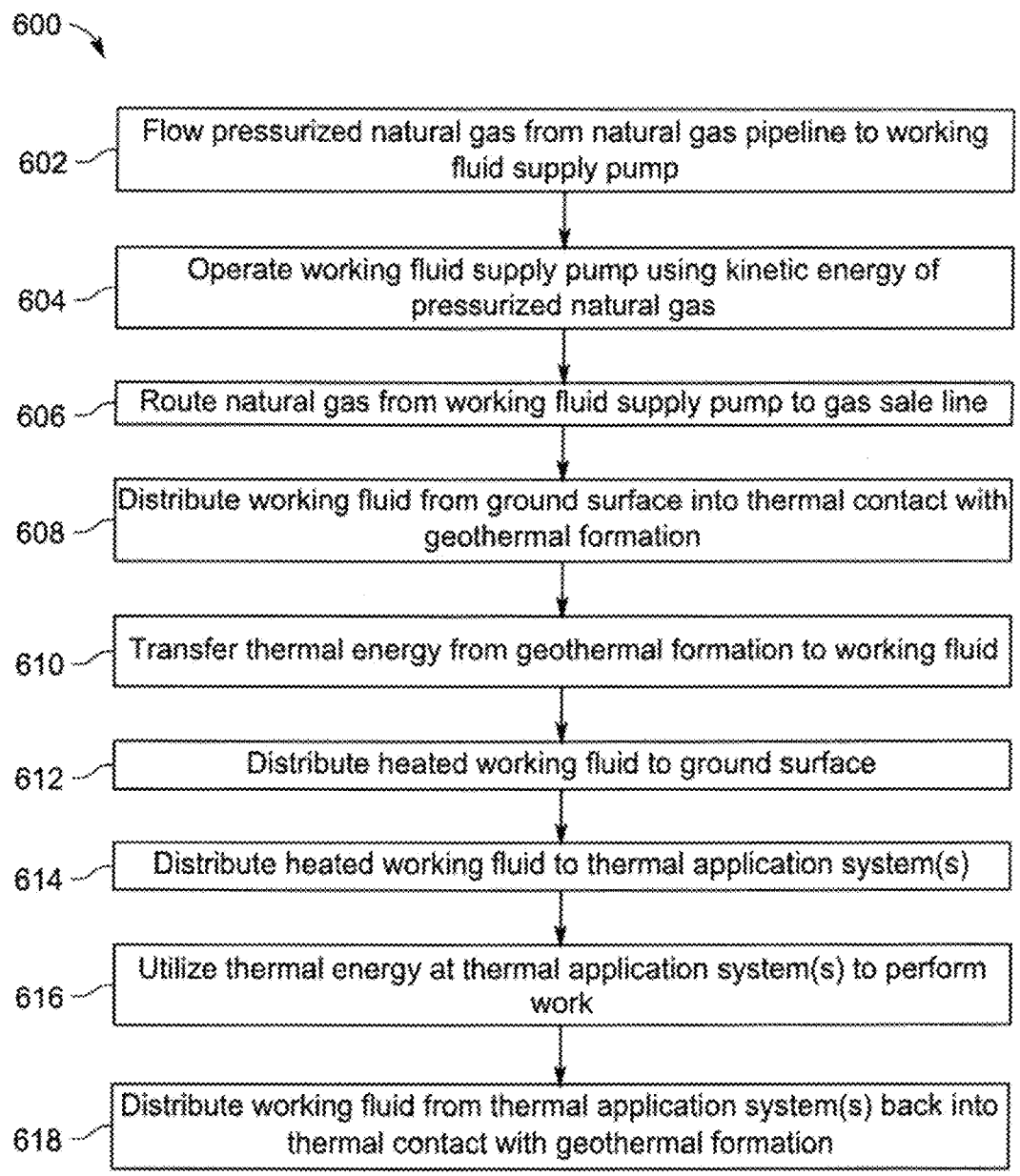
FIG. 10 is a flow diagram of an illustrative embodiment of the renewable geothermal energy harvesting methods in which kinetic energy of pressurized natural gas is used to operate a working fluid supply pump.

Referring next to FIG. 10 of the drawings, a flow diagram 600 of an illustrative embodiment of the renewable geothermal energy harvesting methods in which kinetic energy of pressurized natural gas is used to operate a working fluid supply pump is illustrated. At Step 602, natural gas may be flown from a natural gas pipeline and/or a natural gas producing well to a working fluid supply pump.

At Step 604, the working fluid supply pump may be operated using solely the kinetic energy of the flowing pressurized natural gas.

At Step 606, the natural gas may be routed from the working fluid supply pump to a gas sale line, pipeline and/or gas producing well.

At Step 608, the working fluid may be distributed from the ground surface into thermal contact with a subterranean geothermal formation.

At Step 610, thermal energy may be transferred from the geothermal formation to the working fluid.

At Step 612, the heated working fluid may be distributed to the ground surface.

At Step 614, the heated working fluid may be distributed to at least one thermal application system. The kinetic energy from the flow pressure of the natural gas may operate the working fluid supply pump which pumps the working fluid into contact with the geothermal formation, to the thermal application system(s) and back to the pump.

At Step 616, the thermal energy may be utilized at the thermal application system(s) to perform work.

At Step 618, the working fluid may be distributed from the thermal application system(s) back into thermal contact with the geothermal formation. Steps 610-618 may subsequently be repeated in a continuous loop.

Figure 11:
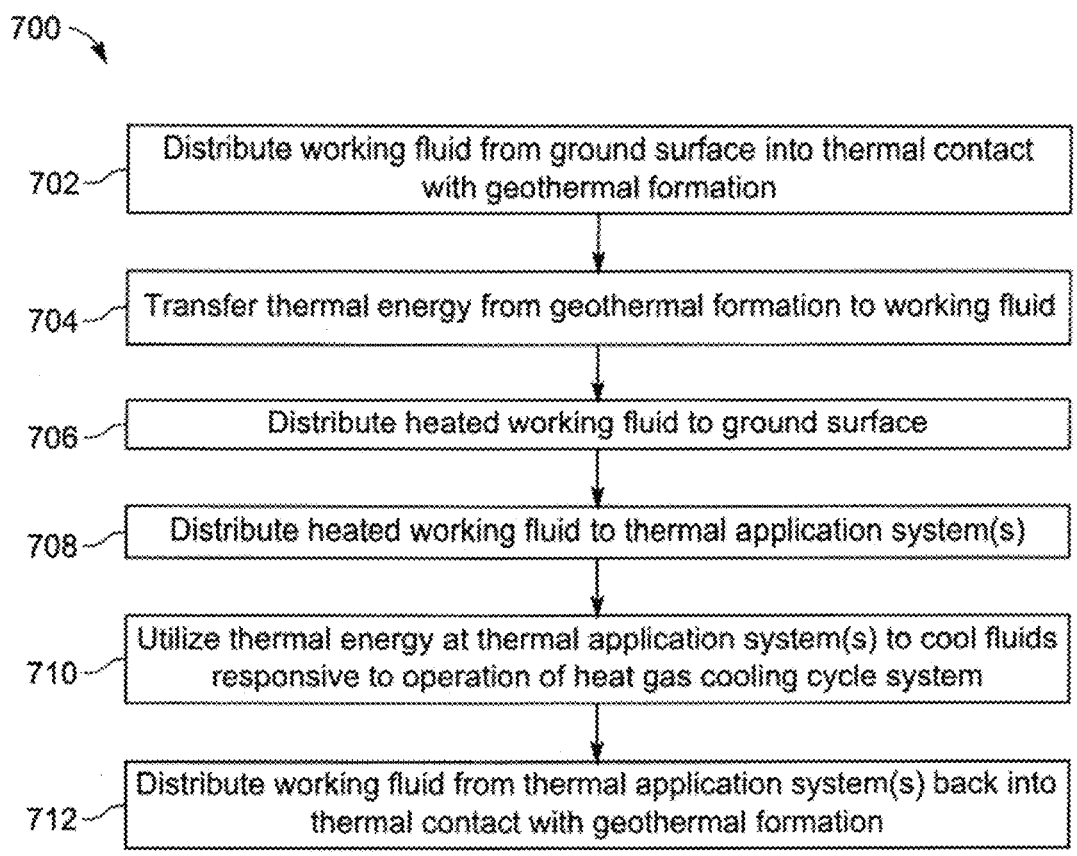
FIG. 11 is a flow diagram of an illustrative embodiment of the renewable geothermal energy harvesting methods which utilizes a gas cooling cycle system.

Referring next to FIG. 11 of the drawings, a flow diagram 700 of an illustrative embodiment of the renewable geothermal energy harvesting methods which utilizes a thermal application system having a gas cooling cycle system is illustrated. At Step 702, at least one working fluid may be distributed from the ground surface into thermal contact with a geothermal formation.

At Step 704, thermal energy may be transferred from the geothermal formation to the working fluid.

At Step 706, the heated working fluid may be distributed to the ground surface.

At Step 708, the heated working fluid may be distributed to at least one thermal application system having at least one heat gas cooling cycle system.

At Step 710, the thermal energy may be utilized at the thermal application system(s) to cool fluids responsive to operation of the heat gas cooling cycle system.

At Step 712, the working fluid may be distributed from the thermal application system(s) back into thermal contact with the geothermal formation. Steps 704-712 may subsequently be repeated in a continuous loop.

Figure 12:
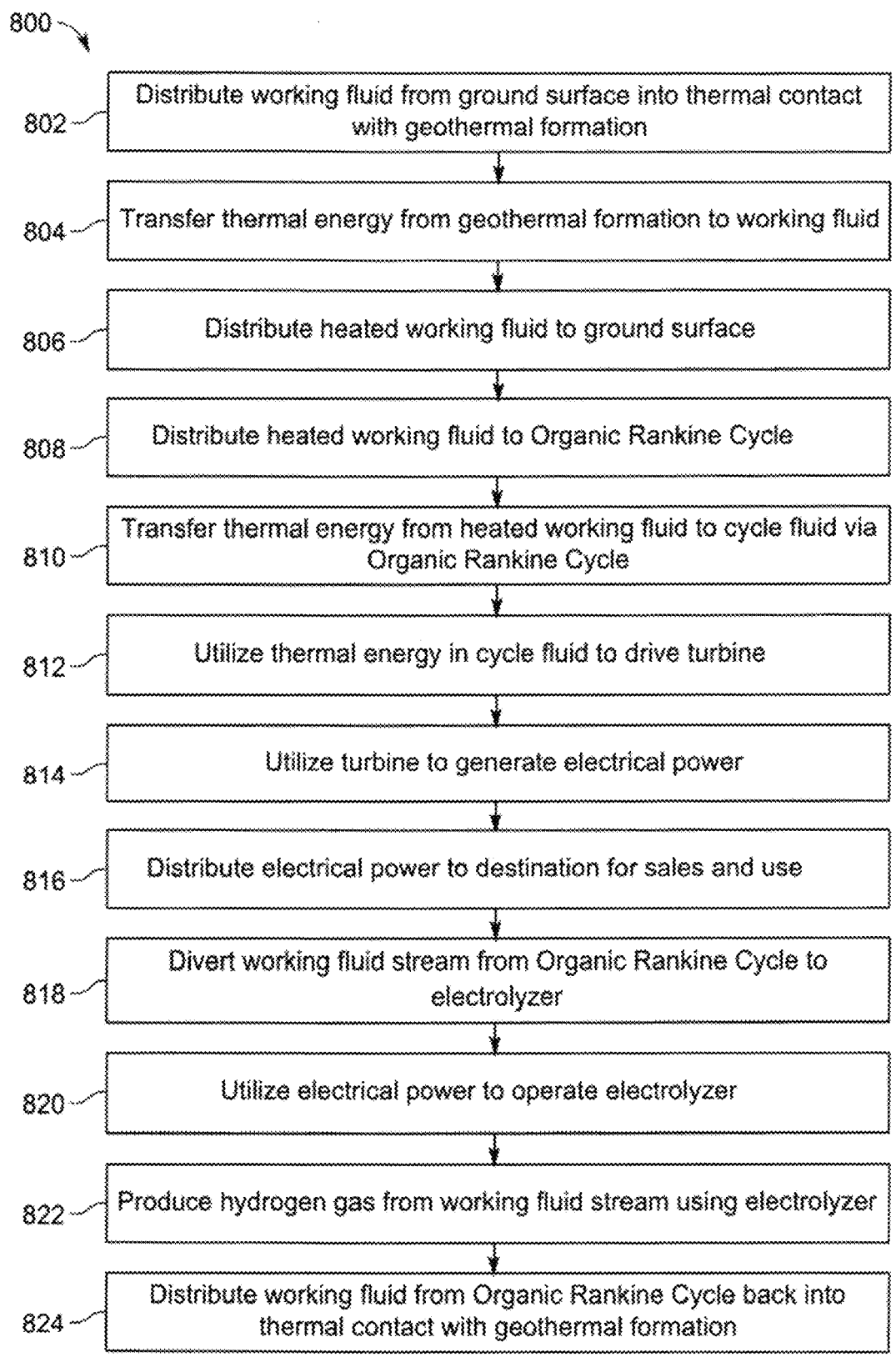
FIG. 12 is a flow diagram of an illustrative embodiment of the renewable geothermal energy harvesting methods which utilizes an organic rankine cycle.

Referring next to FIG. 12 of the drawings, a flow diagram 800 of an illustrative embodiment of the renewable geothermal energy harvesting methods which utilizes an organic rankine cycle is illustrated. At Step 802, at least one working fluid may be distributed from the ground surface into thermal contact with a subterranean geothermal formation.

At Step 804, thermal energy may be transferred from the geothermal formation to the working fluid.

At Step 806, the heated working fluid may be distributed to the ground surface.

At Step 808, the heated working fluid may be distributed to an organic rankine cycle.

At Step 810, thermal energy may be transferred from the heated working fluid to cycle fluid via the organic rankine cycle.

At Step 812, the thermal energy in the cycle fluid may be utilized to drive at least one turbine.

At Step 814, the turbine may be used to generate electrical power.

At Step 816, the electrical power may be distributed to a destination for sales and use.

At Step 818, a working fluid stream may be distributed or diverted from the organic rankine cycle to at least one electrolyzer. Additionally or alternatively, at least one other source of water may be distributed to the electrolyzer.

At Step 820, the electrical power may be utilized to operate the electrolyzer.

At step 822, hydrogen gas may be produced from the working stream using the electrolyzer.

At Step 824, the working fluid may be distributed from the organic rankine cycle back into thermal contact with the geothermal formation. Steps 804-824 may subsequently be repeated in a continuous loop.

Figure 13:
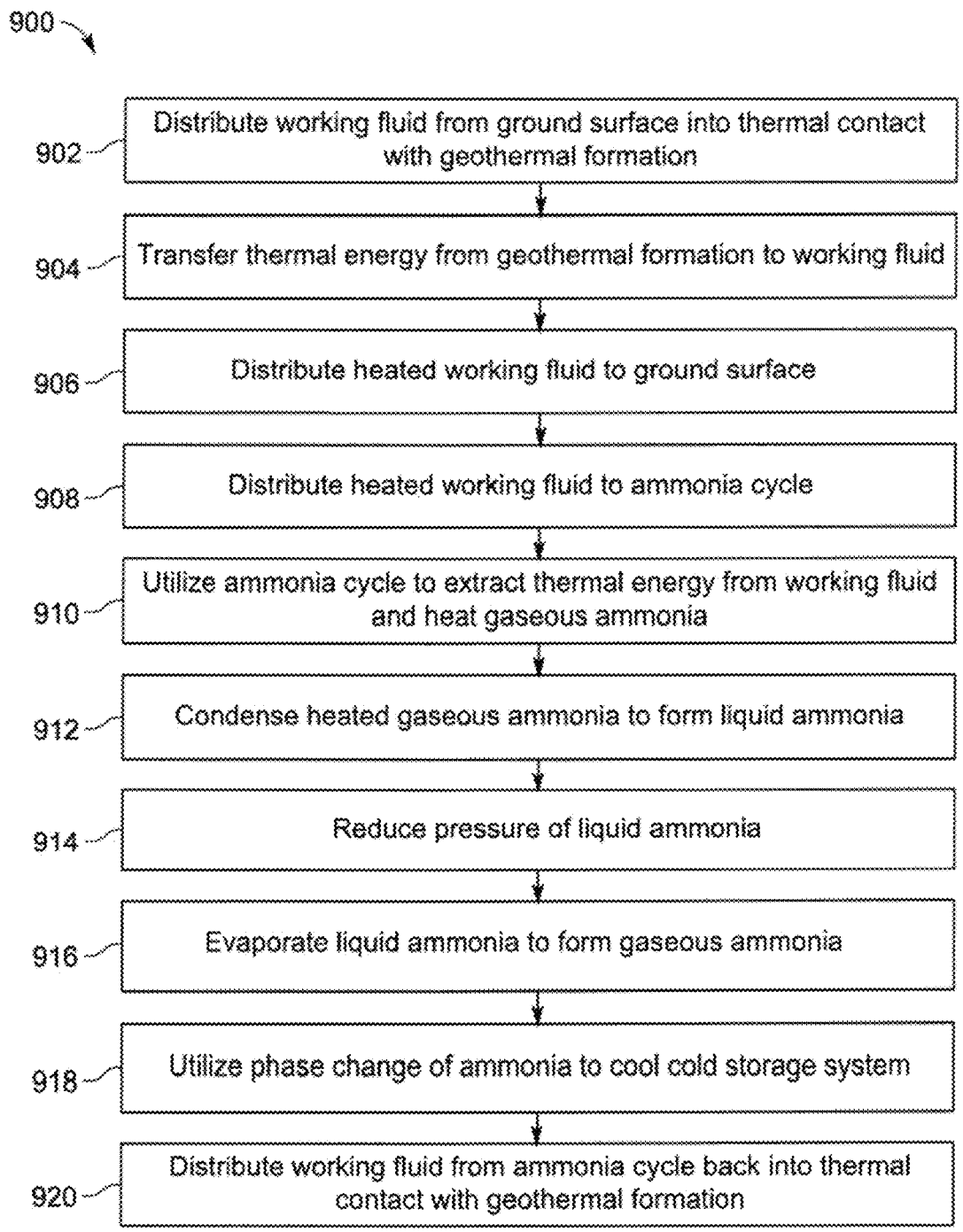
FIG. 13 is a flow diagram of an illustrative embodiment of the renewable geothermal energy harvesting methods which utilizes an ammonia cycle.

Referring next to FIG. 13 of the drawings, a flow diagram of an illustrative embodiment of the renewable geothermal energy harvesting methods which utilizes an ammonia cycle is generally indicated by reference numeral 900. At Step 902, at least one working fluid may be distributed from the ground surface into thermal contact with a subterranean geothermal formation.

At Step 904, thermal energy may be transferred from the geothermal formation to the working fluid.

At Step 906, the heated working fluid may be distributed to the ground surface.

At Step 908, the heated working fluid may be distributed to at least one ammonia cycle.

At Step 910, the ammonia cycle may be utilized to extract thermal energy from the working fluid and heat the gaseous ammonia.

At Step 912, the heated gaseous ammonia may be condensed to form liquid ammonia.

At Step 914, the pressure of the liquid ammonia may be reduced.

At Step 916, the liquid ammonia may be evaporated to form gaseous ammonia.

At Step 918, the phase change of the ammonia may be utilized to cool and cold storage system.

At Step 920, the working fluid may be distributed from the ammonia cycle back into thermal contact with the geothermal formation. Steps 904-920 may subsequently be repeated in a continuous loop.

Figure 14:
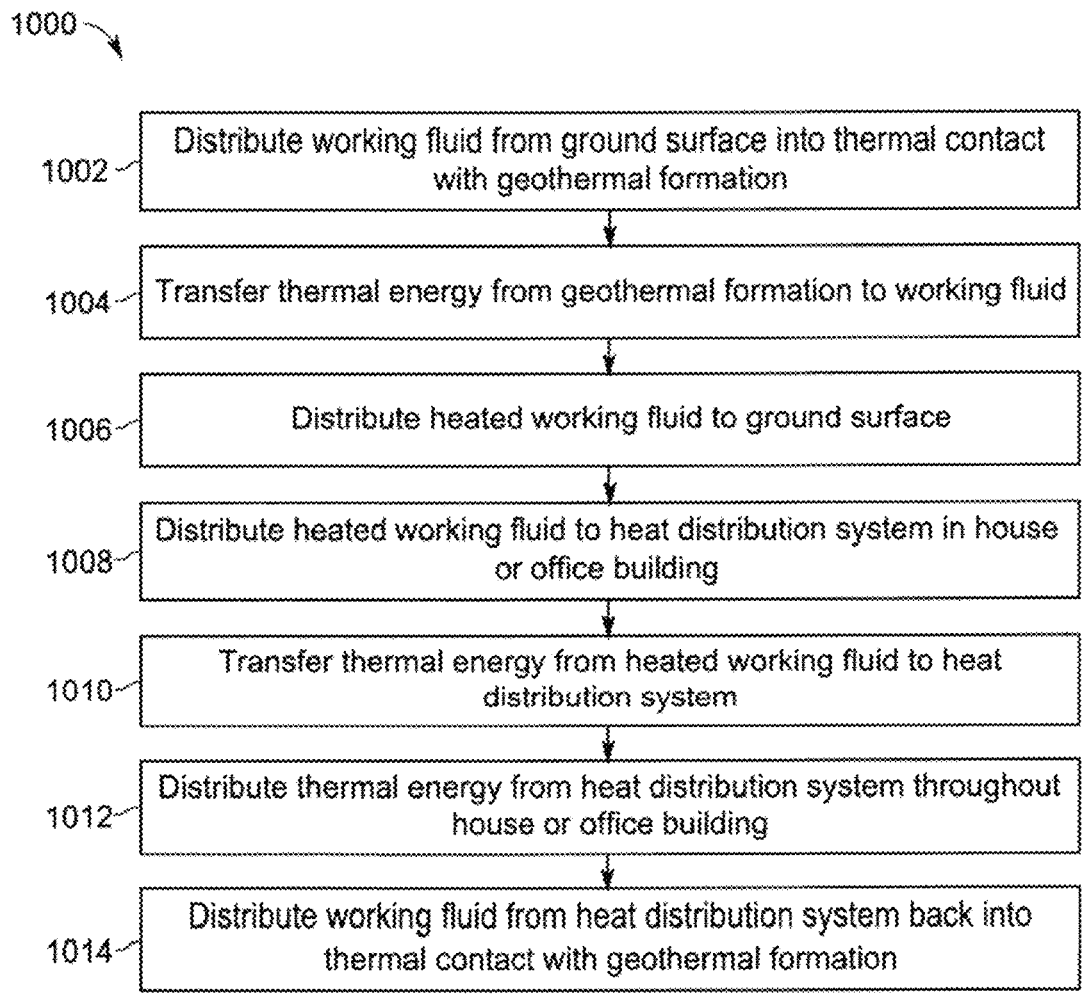
FIG. 14 is a flow diagram of an alternative illustrative embodiment of the renewable geothermal energy harvesting methods in a geothermal application by which heat is provided to a house or an office building.

Referring next to FIG. 14 of the drawings, a flow diagram of an alternative illustrative embodiment of the renewable geothermal energy harvesting methods in a geothermal application by which heat is provided to a house or office building is generally indicated by reference numeral 1000. At Step 1002, at least one working fluid may be distributed from the ground surface into thermal contact with a subterranean geothermal formation.

At Step 1004, thermal energy may be transferred from the geothermal formation to the working fluid.

At Step 1006, the heated working fluid may be distributed to the ground surface.

At Step 1008, the heated working fluid may be distributed to a heat distribution system in a house or office building.

At Step 1010, thermal energy may be transferred from the heated working fluid to a heat distribution system in the house or office building.

At Step 1012, thermal energy may be distributed from the heat distribution system throughout the house or office building.

At Step 1014, the working fluid may be distributed from the heat distribution system back into thermal contact with the geothermal formation.

Figure 15:
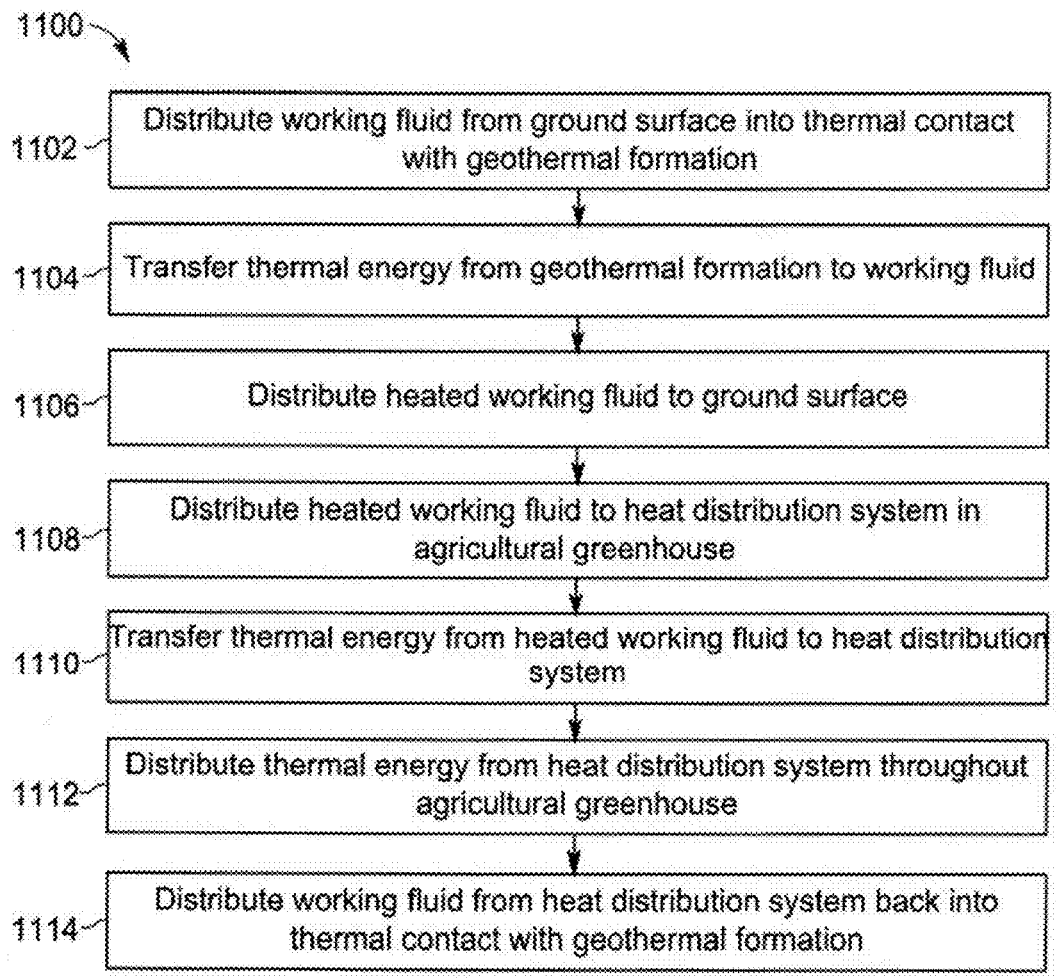
FIG. 15 is a flow diagram of an alternative illustrative embodiment of the renewable geothermal energy harvesting methods in a geothermal application by which heat is provided to an agricultural greenhouse.

Referring next to FIG. 15 of the drawings, a flow diagram of an alternative illustrative embodiment of the renewable geothermal energy harvesting methods in a geothermal application by which heat is provided to an agricultural greenhouse is generally indicated by reference numeral 1100. At Step 1102, at least one working fluid may be distributed from the ground surface into thermal contact with a subterranean geothermal formation.

At Step 1104, thermal energy may be transferred from the geothermal formation to the working fluid.

At Step 1106, the heated working fluid may be distributed to the ground surface.

At Step 1108, the heated working fluid may be distributed to a heat distribution system in an agricultural greenhouse.

At Step 1010, thermal energy may be transferred from the heated working fluid to the heat distribution system in the agricultural greenhouse.

At Step 1012, thermal energy may be distributed from the heat distribution system throughout the agricultural greenhouse.

At Step 1014, the working fluid may be distributed from the heat distribution system back into thermal contact with the geothermal formation. Steps 1104-1114 may subsequently be repeated in a continuous loop.

Figure 16:
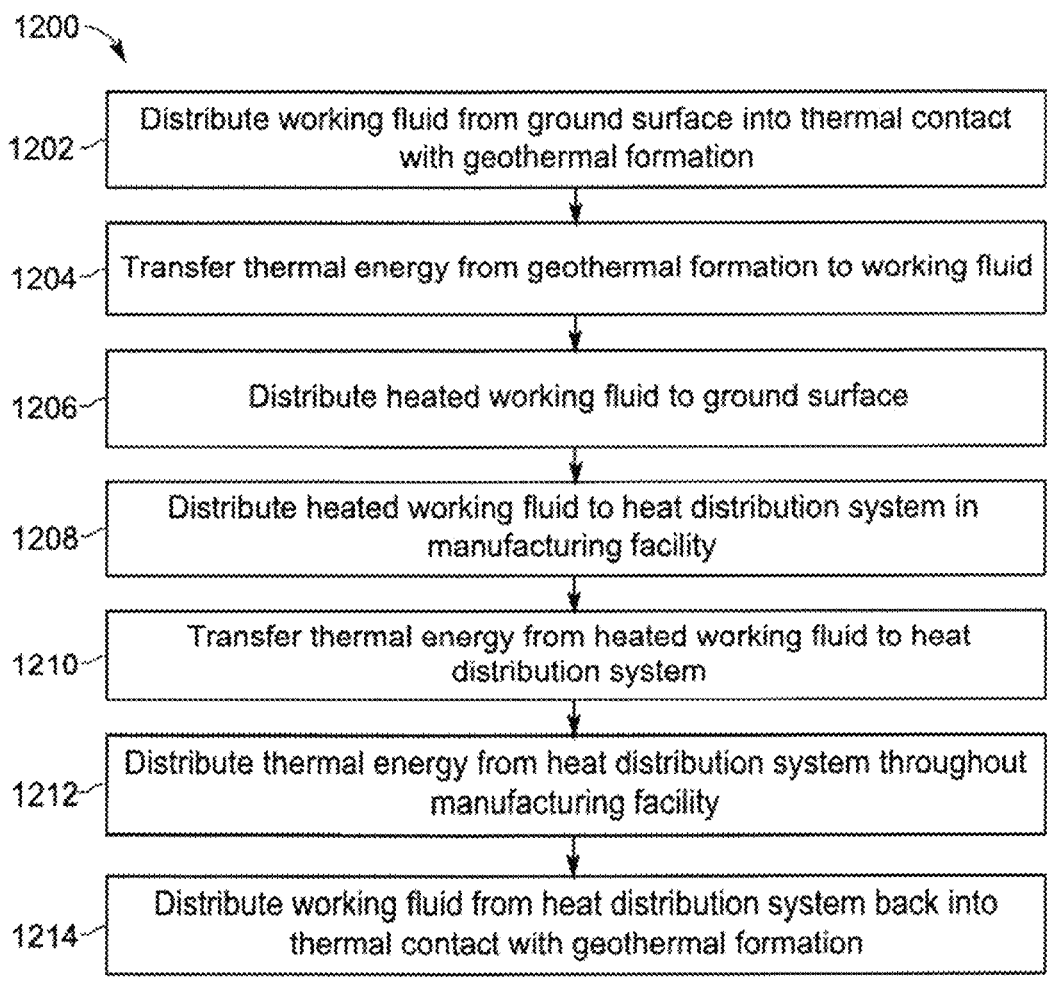
FIG. 16 is a flow diagram of an alternative illustrative embodiment of the renewable geothermal energy harvesting methods in a geothermal application by which heat is provided to a manufacturing facility.

Referring next to FIG. 16 of the drawings, a flow diagram of an alternative illustrative embodiment of the renewable geothermal energy harvesting methods in a geothermal application by which heat is provided to a manufacturing facility is generally indicated by reference numeral 1200. At Step 1202, at least one working fluid may be distributed from the ground surface into thermal contact with a subterranean geothermal formation.

At Step 1204, thermal energy may be transferred from the geothermal formation to the working fluid.

At Step 1206, the heated working fluid may be distributed to the ground surface.

At Step 1208, the heated working fluid may be distributed to a heat distribution system in a manufacturing facility.

At Step 1210, thermal energy may be transferred from the heated working fluid to the heat distribution system in the manufacturing facility.

At Step 1212, thermal energy may be distributed from the heat distribution system throughout the manufacturing facility.

At Step 1214, the working fluid may be distributed from the heat distribution system back into thermal contact with the geothermal formation. Steps 1204-1214 may subsequently be repeated in a continuous loop.

Figure 17:
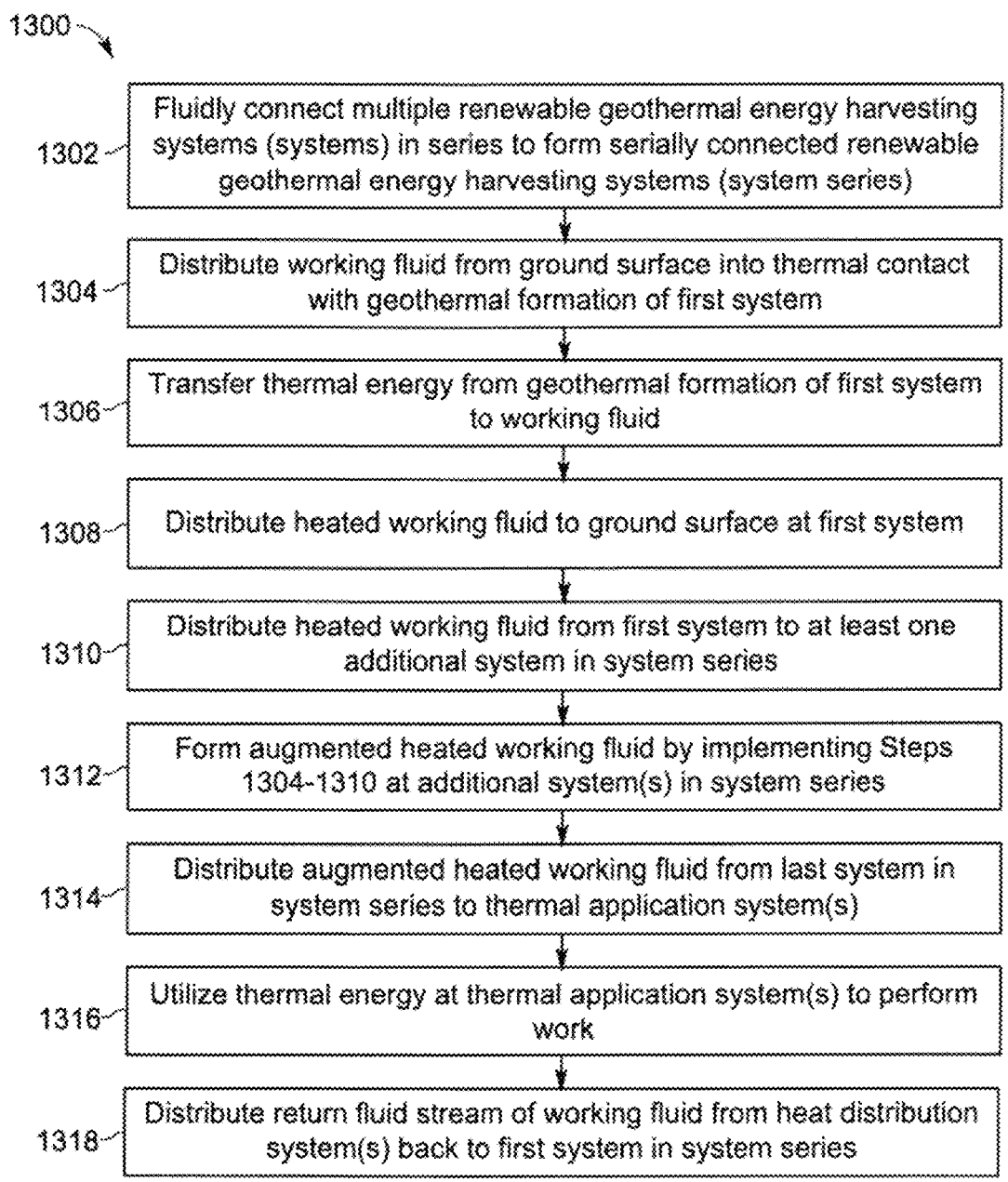
FIG. 17 is a flow diagram of an illustrative embodiment of the renewable geothermal energy harvesting methods in which multiple renewable geothermal energy harvesting systems are serially connected to each other to form a system series in some applications of the systems and methods.

Referring next to FIG. 17 of the drawings, a flow diagram of an illustrative embodiment of the renewable geothermal energy harvesting methods in which multiple renewable geothermal energy harvesting systems are serially connected to each other to form a system series in some applications of the systems and methods is generally indicated by reference numeral 1300. At Step 1302, multiple renewable geothermal energy harvesting systems, hereinafter systems, may be fluidly connected in series to form serially connected renewable geothermal energy harvesting systems, hereinafter system series.

At Step 1304, at least one working fluid may be distributed from the ground surface into thermal contact with a geothermal formation of the first system.

At Step 1306, thermal energy may be transferred from the geothermal formation of the first system to the working fluid.

At Step 1308, the heated working fluid may be distributed to the ground surface at the first system.

At Step 1310, the heated working fluid may be distributed from the first system to at least one additional system in the system series.

At Step 1312, an augmented heated working fluid may be formed by implementing steps 1304-1310 at additional system(s) in the system series.

At Step 1314, the augmented heated working fluid may be distributed from the last system in the system series to at least one thermal application system.

At Step 1316, the thermal energy may be utilized at the thermal application system(s) to perform work.

At Step 1318, a return fluid stream of the working fluid may be distributed from the heat distribution system(s) back to the first system in the system series. Steps 1304-1318 may subsequently be repeated in a continuous loop.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A renewable geothermal energy harvesting method, comprising:
    deploying a subterranean well casing in a drilled wellbore extending into a subterranean geothermal formation, the subterranean well casing having a well casing wall fluidly closed or sealed from the subterranean geothermal formation, the well casing wall having an interior well casing wall surface;
    deploying a fluid flow conduit in the subterranean well casing, the fluid flow conduit having a fluid flow conduit wall with an exterior fluid flow conduit surface;
    forming a well annulus by and between the interior wall surface of the subterranean well casing and the exterior conduit surface of the fluid flow conduit, the well annulus disposed in fluid communication with the subterranean well casing and the fluid flow conduit, the well annulus consisting essentially of volume formed by and between the interior well casing wall surface of the well casing and the exterior fluid flow conduit surface of the fluid flow conduit, whereby the fluid flow conduit and the well annulus form a closed loop fluidly closed or sealed from the subterranean geothermal formation for fluid flow and production fluids are confined to the subterranean geothermal formation;
    distributing at least one working fluid from a ground surface through a first one of the well annulus and the fluid flow conduit into thermal contact with the subterranean geothermal formation by flowing natural gas from a natural gas line of at least one natural gas pipeline located in proximity to the wellbore and utilizing kinetic energy of the natural gas to pump the at least one working fluid;
    transferring thermal energy from the at least one subterranean geothermal formation to the at least one working fluid;
    distributing the at least one working fluid from the at least one subterranean geothermal formation back to the ground surface through a second one of the well annulus and the fluid flow conduit;
    distributing the at least one working fluid directly to at least one thermal application system, the at least one thermal application system configured to utilize the thermal energy to perform work; and
    utilizing the thermal energy at the at least one thermal application system to perform the work.

2. The method of claim 1 further comprising recirculating at least one recirculation stream of the at least one working fluid back into thermal contact with the at least one subterranean geothermal formation at least one time prior to the distributing the at least one working fluid directly to the at least one thermal application system.

3. The method of claim 1 wherein utilizing the thermal energy at the at least one thermal application system to perform the work comprises utilizing the thermal energy at the at least one thermal application system comprising at least one of the following: a heat gas cooling cycle system, an organic Rankine cycle, an ammonia cycle, and a geothermal heating system to perform the work.

4. The method of claim 3 wherein utilizing the thermal energy at the organic Rankine cycle to perform the work comprises utilizing the thermal energy at the organic Rankine cycle to generate electrical current.

5. The method of claim 4 further comprising generating hydrogen by operating at least one electrolyzer using the electrical current.

6. The method of claim 4 further comprising distributing the electrical current to an electrical distribution and sales system or network.

7. The method of claim 3 wherein utilizing the thermal energy at the ammonia cycle to perform the work comprises utilizing the thermal energy at the ammonia cycle to cool a cold storage facility.

8. The method of claim 3 wherein utilizing the thermal energy at the geothermal heating system to perform the work comprises utilizing the thermal energy at the geothermal heating system to perform at least one of the following: heat a house or office building, heat an agricultural greenhouse, and heat a manufacturing facility.

9. The method of claim 1 wherein distributing the at least one working fluid from the ground surface into thermal contact with at least one subterranean geothermal formation comprises serially distributing the at least one working fluid from the ground surface into thermal contact with a plurality of subterranean geothermal formations prior to the distributing the at least one working fluid directly to the at least one thermal application system.

10. The method of claim 1 further comprising routing the natural gas to at least one of a gas sale line, a pipeline and a gas producing well.

11. A renewable geothermal energy harvesting method utilizing a horizontal well, comprising:
    forming the horizontal well in a subterranean geothermal formation;
    installing a well casing in the horizontal well, the well casing having a well casing wall fluidly closed or sealed from the subterranean geothermal formation, the well casing wall having an interior well casing wall surface;

inserting a thermally insulated fluid flow conduit into the well casing of the horizontal well and in fluid communication with the well casing, with a well annulus surrounding the fluid flow conduit, the well annulus consisting essentially of volume formed by and between the interior well casing wall surface of the well casing and the exterior fluid flow conduit surface of the fluid flow conduit, whereby the fluid flow conduit and the well annulus form a closed loop fluidly closed or sealed from the subterranean geothermal formation for fluid flow and production fluids are confined to the subterranean geothermal formation;

providing a working fluid supply pump in fluid communication with a selected one of the well annulus and the fluid flow conduit;

providing a natural gas line of a natural gas pipeline located in proximity to the horizontal well in fluid communication with the working fluid supply pump;

distributing the at least one working fluid from a ground surface through a first one of the well annulus and the fluid flow conduit into thermal contact with a subterranean geothermal formation by flowing natural gas from the natural gas line of the natural gas pipeline and utilizing kinetic energy of the natural gas to pump the at least one working fluid, wherein only the kinetic energy from the natural gas flowing from the natural gas line operates the working fluid supply pump;

distributing the natural gas from the working fluid supply pump directly to a selected one of the natural gas line of the natural gas pipeline and a gas sale line;

transferring thermal energy from the subterranean geothermal formation to the at least one working fluid solely by thermal conduction through the well casing wall of the well casing;

distributing the at least one working fluid through a second one of the well annulus and the fluid flow conduit to the ground surface;

distributing the at least one working fluid directly to at least one thermal application system comprising at least one of the following: a heat gas cooling cycle system, an organic Rankine cycle, an ammonia cycle, and a geothermal heating system, the at least one thermal application system configured to utilize the thermal energy to perform work; and utilizing the thermal energy at the at least one thermal application system to perform the work.

12. The method of claim 11 further comprising recirculating at least one recirculation stream of the at least one working fluid back into thermal contact with the at least one subterranean geothermal formation at least one time prior to the distributing the at least one working fluid directly to the at least one thermal application system.

13. The method of claim 11 wherein utilizing the thermal energy at the organic Rankine cycle to perform the work comprises utilizing the thermal energy at the organic Rankine cycle to generate electrical current.

14. The method of claim 13 further comprising generating hydrogen by operating at least one electrolyzer using the electrical current.

15. The method of claim 13 further comprising distributing the electrical current to an electrical distribution and sales system or network.

16. The method of claim 11 wherein utilizing the thermal energy at the ammonia cycle to perform the work comprises utilizing the thermal energy at the ammonia cycle to cool a cold storage facility.

17. The method of claim 11 wherein utilizing the thermal energy at the geothermal heating system to perform the work comprises utilizing the thermal energy at the geothermal heating system to perform at least one of the following: heat a house or office building, heat an agricultural greenhouse, and heat a manufacturing facility.

18. The method of claim 11 wherein distributing the at least one working fluid from the ground surface into thermal contact with at least one subterranean geothermal formation comprises serially distributing the at least one working fluid from the ground surface into thermal contact with a plurality of subterranean geothermal formations prior to the distributing the at least one working fluid directly to the at least one thermal application system.

19. A renewable geothermal energy harvesting system configured to harvest thermal energy from a subterranean geothermal formation and perform work using the thermal energy, comprising:

a wellhead at a ground surface;

a well casing extending from the wellhead at the ground surface into and in thermal contact with the subterranean geothermal formation, the well casing configured to be fluidly closed or sealed from the subterranean geothermal formation, the well casing including a well casing wall having an interior well casing wall surface;

a fluid flow conduit extending into the well casing, the fluid flow conduit disposed in fluid communication with the wellhead, the fluid flow conduit including a fluid flow conduit wall with an exterior fluid flow conduit surface;

a well annulus between the fluid flow conduit and the well casing, the well annulus disposed in fluid communication with the wellhead, the well annulus consisting essentially of volume formed by and between the interior well casing wall surface of the well casing and the exterior fluid flow conduit surface of the fluid flow conduit, whereby the fluid flow conduit and the well annulus are configured to form a first closed loop fluidly closed or sealed from the subterranean geothermal formation for fluid flow and production fluids are confined to the subterranean geothermal formation;

a working fluid supply disposed in fluid communication with the wellhead, the working fluid supply configured to contain at least one working fluid comprising refrigerant;

a working fluid supply pump in fluid communication with a selected one of the well annulus and the fluid flow conduit, the working fluid supply pump having an inlet port and an exhaust port;

a natural gas line of a natural gas pipeline located in proximity to the wellhead disposed in fluid communication with the inlet port of the working fluid supply pump;

a selected one of the natural gas line of the natural gas pipeline and a gas sale line disposed in direct fluid communication with the exhaust port of the working fluid supply pump, wherein the working fluid supply pump is configured to utilize only kinetic energy of natural gas flowing from the natural gas line of the natural gas pipeline to the gas sale line to pump the at least one working fluid, whereby none of the natural gas is consumable or exhaustible to the atmosphere;

at least one thermal application system disposed in direct fluid communication with the wellhead, the at least one thermal application system configured to utilize the thermal energy to perform the work; and wherein the wellhead is configured to distribute the at least one working fluid from the ground surface into thermal contact with the subterranean geothermal formation through a first one of the fluid flow conduit and the well annulus and from the subterranean geothermal formation to the at least one thermal application system through a second one of the fluid flow conduit and the well annulus.

20. The system of claim 19 wherein the at least one thermal application system comprises at least one of the following: a heat gas cooling cycle system, an organic Rankine cycle system, an ammonia cycle system, and a geothermal heating system.

* * * * *